United States Patent
Biegert et al.

(10) Patent No.: US 8,244,125 B2
(45) Date of Patent: Aug. 14, 2012

(54) PASSIVE OPTICAL NETWORK PROTECTION SWITCHING

(75) Inventors: Mark R. Biegert, Maple Grove, MN (US); Peter O. Lee, Rogers, MN (US); David D. Cleary, Bloomington, MN (US)

(73) Assignee: Calix, Inc., Petaluma, CA (US)

( * ) Notice: Subject to any disclaimer, the term of this patent is extended or adjusted under 35 U.S.C. 154(b) by 847 days.

(21) Appl. No.: 12/356,587

(22) Filed: Jan. 21, 2009

(65) Prior Publication Data

US 2010/0183298 A1    Jul. 22, 2010

(51) Int. Cl.
*H04B 10/08* (2006.01)

(52) U.S. Cl. ............... 398/17; 398/12; 398/19; 398/20; 398/28; 398/139

(58) Field of Classification Search .............. 398/12, 398/17, 19–20, 28
See application file for complete search history.

(56) References Cited

U.S. PATENT DOCUMENTS

| | | |
|---|---|---|
| 6,771,908 B2 | 8/2004 | Eijk et al. |
| 6,868,232 B2 | 3/2005 | Eijk et al. |
| 2005/0019031 A1 * | 1/2005 | Ye et al. ............... 398/19 |
| 2007/0217788 A1 | 9/2007 | Gao et al. |
| 2008/0063394 A1 | 3/2008 | Chi |
| 2008/0131124 A1 | 6/2008 | Nam et al. |

OTHER PUBLICATIONS

Pon Power Meter, PPM-350B, Network Testing, Telecommunications Test and Measurement, 4 pages, 2004, http://documents.exfo.com/specsheets/PPM-350B-angHR.pdf.
Gariepy et al., 131 Application Note, PPM-350B Measurement Techniques, Telecom Test and Measurement, 2 pages, 2006, http://documents.exfo.com/appnotes/anote131-ang.pdf.

* cited by examiner

*Primary Examiner* — Dung Nguyen
(74) *Attorney, Agent, or Firm* — Shumaker & Sieffert, P.A.

(57) ABSTRACT

This disclosure relates to detection of optical fiber failure and implementation of protection switching in a passive optical network (PON). A protection switch determines whether there is an optical fiber failure in a fiber link between an OLT and a group of ONTs. In the case of an optical fiber failure, an optical fiber may be physically cut or damaged, causing the optical fiber link to be disabled. A protection switch may detect an optical fiber failure by determining a peak optical power of at least a portion of an upstream optical signal transmitted from one or more ONTs via the optical fiber link. If the peak optical power is less than a threshold value, the protection switch may detect a fiber failure. In response to a detected fiber failure, the protection switch may switch upstream and downstream PON transmissions from a primary optical fiber to a secondary optical fiber.

27 Claims, 9 Drawing Sheets

PASSIVE OPTICAL NETWORK PROTECTION SWITCHING

TECHNICAL FIELD

This disclosure relates to optical communication and, more particularly, to passive optical network (PON) protection switching.

BACKGROUND

A passive optical network (PON) can deliver voice, video and data services among multiple network nodes, often referred to as optical network terminals (ONTs), using a shared optical fiber. Passive optical splitters and combiners enable multiple ONTs to share the same optical fiber link. For example, downstream information carried by the shared optical fiber link may be optically split for transmission to multiple ONTs via individual optical fibers. Likewise, upstream information received from individual ONTs via individual optical fibers may be optically combined for transmission via the shared optical fiber link. An ONT, sometimes referred to as a subscriber premises node, may be connected to one or more subscriber devices, such as televisions, set-top boxes, telephones, computers, or network appliances, which utilize voice, video and data services delivered via the PON.

A PON typically includes a PON interface, sometimes referred to as an optical line termination (OLT), which may have multiple PON interface modules. The PON interface modules serve respective optical fiber links. An OLT provides an interface for downstream transmission and upstream reception of information over a shared optical fiber link that serves a group of ONTs. The OLT may be coupled to an optical splitter/combiner via the shared optical fiber link. A PON is inherently a downstream-multicast medium. Each downstream communication on the shared optical fiber link can be received by every ONT served by that link. ONTs may identify selected packets or frames on the optical fiber link based on addressing information included within the packets or frames. In addition, individual ONTs transmit upstream packets to the OLT via the shared optical fiber link.

SUMMARY

In general, this disclosure relates to techniques for detecting optical fiber link failure and implementing protection switching in a PON. A protection switch determines whether there is an optical fiber failure in a fiber link between an OLT and a group of ONTs. In the case of an optical fiber link failure, an optical fiber may be physically cut or damaged, causing the optical fiber link to be disabled. In accordance with various aspects of this disclosure, a protection switch may detect an optical fiber link failure by determining a peak optical power of at least a portion of an upstream optical signal transmitted from one or more ONTs via the optical fiber link. If the peak optical power is less than a threshold value, the protection switch may detect an optical fiber link failure.

In response to detection of an optical fiber link failure, the protection switch may switch upstream and downstream PON transmission from a primary optical fiber link to a secondary optical fiber link that provides an alternative, backup optical fiber link between the OLT and the ONTs. In this case, the protection switch redirects upstream and downstream transmissions along a secondary fiber link that also couples the OLT to the ONTs, permitting the OLT to maintain communication between the OLT and ONTs via a redundant link in the event of fiber failure. Detection of fiber failure based on a peak optical power of the upstream optical signal may support reliable and cost-effective protection switching across optical fiber links that serve multiple ONTs in a PON.

In one aspect, the disclosure provides a method comprising measuring a peak optical power of at least a portion of an upstream optical signal transmitted via an optical fiber link in a passive optical network (PON), comparing the measured peak optical power to a threshold value, and detecting a failure of the optical fiber link based on the comparison.

In another aspect, the disclosure provides a protection switch in a passive optical network (PON), the protection switch comprising an optical tap that receives an upstream optical signal transmitted via an optical fiber link in the PON, and a detector that receives at least a portion of the upstream optical signal from the optical tap, measures a peak optical power of the portion of the upstream optical signal, compares the measured peak optical power to a threshold value, and detects a failure on the optical fiber link based on the comparison.

In an additional aspect, the disclosure provides a PON comprising an OLT, a protection switch coupled to the OLT, one or more ONTs, and a first optical fiber link and a second optical fiber link coupled to the protection switch and to the one or more ONTs, wherein the protection switch comprises an optical tap that receives an upstream optical signal transmitted via the first optical fiber link in the PON from the one or more ONTs, a detector that receives at least a portion of the upstream optical signal from the optical tap, measures a peak optical power of the portion of the upstream optical signal, compares the measured peak optical power to a threshold value, and detects a failure on the optical fiber link based on the comparison, and an optical switch that couples the upstream optical signal and a downstream optical signal on the first optical fiber link or the second optical fiber link based on the detection of the failure.

The details of one or more aspects of the disclosure are set forth in the accompanying drawings and the description below. Other features, objects, and advantages will be apparent from the description and drawings, and from the claims.

DETAILED DESCRIPTION

Figure 1:
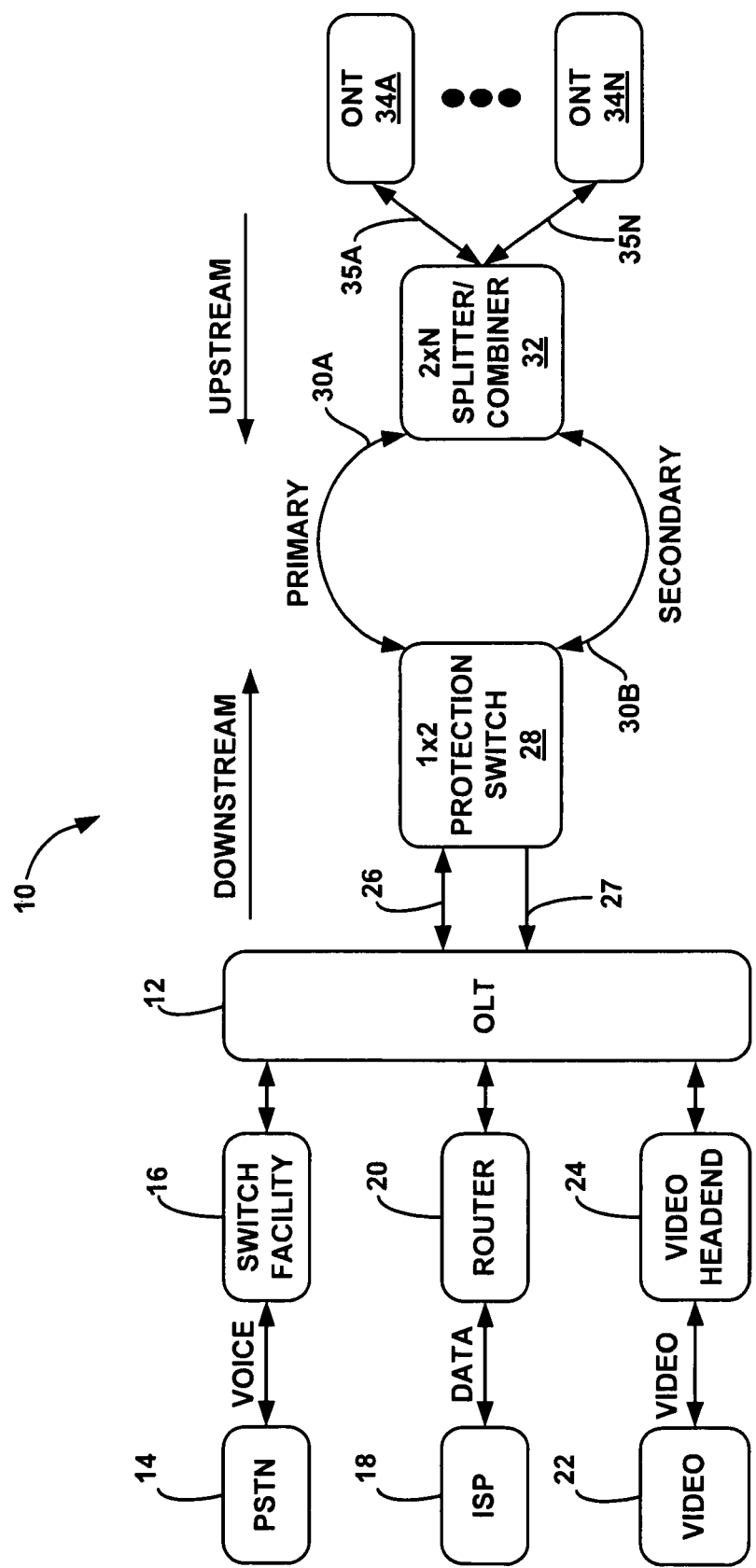
FIG. 1 is a block diagram illustrating a passive optical network (PON).

This disclosure describes techniques for protection switching based on detection of the failure of an optical fiber link that couples an OLT to one or more ONTs in a PON. An OLT provides voice, video, and data services to the ONTs via the optical fiber link. An optical fiber may be physically cut or damaged, causing the optical fiber link to be disabled. If there is a fiber failure in the fiber link that couples the OLT to the ONTs, transmission and reception of data between the OLT and ONTs may be disabled, causing subscribers associated with the ONTs to lose access to voice, video, and data services.

For example, a failure on a shared optical fiber extending between the OLT and a passive optical splitter/combiner that feeds multiple ONTs generally may result in loss of service for all of the ONTs. In this case, failure of the shared optical fiber link causes services to be interrupted for multiple ONTs. A failure in an optical fiber extending from the passive optical splitter/combiner to an individual ONT generally will result in loss of service for that ONT only, without disrupting service for other ONTs.

Loss of data services, such as Internet access, may be inconvenient for a residential subscriber or disruptive to a business subscriber's business operations. Loss of video services may result in interruption of television programs or movies. Voice services may have stringent, government-enforced, reliability requirements on availability. Business private branch exchange (PBX) transport may carry many phone calls simultaneously. Failure of a shared optical fiber link extending from an OLT to a splitter/combiner may result in the loss of large numbers of phone calls. Accordingly, it is desirable to implement techniques that detect where there is a failure on the shared optical fiber link that couples the OLT to the ONTs. It is also desirable to implement techniques to reestablish communication between the OLT and ONTs after the detection of an optical fiber link failure, thereby supporting higher levels of PON availability.

As used in this disclosure, the term "fiber failure" may generally refer to any condition in which an optical fiber link does not function properly. For example, a fiber failure encompasses situations where there is a physical break in the optical fiber. As another example, a fiber failure also encompasses situations where the fiber has become disconnected from its desired location. As yet another example, a fiber failure also encompasses situations where the optical fiber link has become entangled or bent allowing little to no light to pass through the optical fiber. In each case, the fiber failure may result in loss of service for the subscribers associated with the ONTs.

Some PON systems may require expensive and/or complicated hardware to detect a fiber failure and reestablish communication. In some fully protected PONs, for example, two or more redundant OLTs may be provided to support services for a particular set of ONTs. In one example, a primary OLT may be coupled to a primary optical splitter/combiner that splits the output of the primary OLT among optical fibers coupled to a set of ONTs. Likewise, a secondary, redundant OLT may be coupled to a secondary optical splitter/combiner that splits the output of the secondary OLT among optical fibers coupled to the same set of ONTs. Each splitter may be a 1×M splitter, where M refers to the number of ONTs coupled to the splitter and 1 refers to the optical fiber link extending from a respective OLT to the splitter. As an example, in some implementations, M may equal 32, indicating that 32 ONTs share the optical fiber link.

Although passive optical splitters and combiners may be implemented as separate components, a combined splitter/combiner will be described for purposes of illustration. In general, the splitter serves to split the downstream optical output of an OLT for downstream transmission to multiple ONTs via individual optical fibers, and the combiner serves to combine the upstream optical outputs of multiple ONTs for upstream transmission to the OLT via the shared optical fiber link. For convenience, this disclosure may refer to a combined optical splitter/combiner as either a splitter or combiner, depending on the operational context in which it is discussed.

The redundant, primary and secondary OLTs may be coupled to the respective optical splitters via respective optical fiber links. In a fully protected PON, each ONT may be coupled to communicate via either the primary optical splitter or the secondary optical splitter, thereby providing the ONTs with redundant trunk connections to the OLTs. Each ONT may be coupled to an N×1 protection switch. In the case of two OLTs and two splitters/combiners, N is equal to 2. For this scenario, each ONT is coupled to both the primary optical splitter and the secondary optical splitter via respective optical fibers. For greater levels of redundancy, N may be greater than 2.

In an example of a fully protected PON, each N×1 protection switch may be configured to measure the average power of the downstream optical signal transmitted to the ONTs from the primary OLT to detect an optical fiber link failure. In some examples, the downstream optical signal is provided at a light wavelength of 1550 nanometers (nm) or 1490 nm. Downstream optical signals at these wavelengths are transmitted substantially continuously. If the average power of the downstream optical signals at these wavelengths remains above a threshold value, the N×1 protection switch detects an intact optical fiber link. If the average power is below the threshold, however, the N×1 protection switch detects an optical fiber link failure and switches to the optical fiber link coupled to the secondary OLT to maintain or establish upstream and downstream communication between the redundant, secondary OLT and the ONTs.

In this example of a fully protected PON, with two OLTs, two optical fiber links, two splitters and two optical fibers to each ONT, the N×1 protection switch is a 2×1 switch where N=2 refers to the number of optical fibers from the splitters to each ONT. In this scenario, detection of an optical fiber link failure by the 2×1 protection switch may be based on a failure of the optical fiber link extending from the primary optical splitter/combiner to the protection switch at the ONT, a failure in the optical fiber link extending from the primary OLT to the primary splitter/combiner, or a failure of the primary OLT. In each case, the protection switch selects the secondary optical fiber link that is coupled to the secondary splitter/combiner and second OLT for upstream and downstream communication in order to maintain or restore communication.

A fully protected PON configuration, as described above, may support a high level of PON availability, but presents substantial complexity and cost. For example, such a configuration may require at least two OLTs, two switches, two fiber paths to each ONT, and a 2×1 protection switch for each ONT. The optical fiber links ordinarily follow geographically diverse paths to the subscribers to reduce the risk that both will be disabled by the same event, e.g., the same backhoe. In addition, the optical losses in a fully protected configuration can be high, possibly reducing the reach of an optical fiber link. Consequently, a fully protected PON scheme may be very expensive, and therefore undesirable for a large number of PON customers.

In accordance with various aspects of this disclosure, this disclosure describes techniques for detecting optical fiber failure and implementing protection switching in a PON. The techniques may, in some examples, require only a single protection switch that resides in the central office with the OLT. In some implementations, the techniques may support reliable and cost-effective PON protection switching. For example, the techniques may be implemented with reduced hardware complexity. In one aspect, the techniques may implement a protection switch that detects an optical fiber link failure by determining a peak optical power of at least a portion of an upstream optical signal transmitted from one or more ONTs via the optical fiber link. If the peak optical power is less than a threshold value, the protection switch may detect an optical fiber link failure. This approach may be implemented, in some examples, to use only the upstream signal to detect a fiber failure, which allows detecting the fiber failure using only protection switch hardware at or near the OLT, e.g., in or near the central office (CO). However, unlike the downstream signal, the collective upstream signal is not continuous. At times of low network activity the duty cycle of the upstream signal can be extremely low. Consequently, measuring the average upstream power may be unreliable and likely to produce frequent false positives. Using peak power to determine whether the PON is intact can eliminate the uncertainty associated with average power.

In response to detection of an optical fiber link failure, the protection switch may switch upstream and downstream PON transmission from a primary optical fiber link to a secondary optical fiber link that provides an alternative, backup optical fiber link between the OLT and the ONTs. The protection switch redirects upstream and downstream transmissions along a secondary fiber link that also couples the OLT to the ONTs, permitting the OLT to maintain communication between the OLT and ONTs via a redundant link in the event of fiber failure. In this manner, the techniques described in this disclosure may support at least partial protection switching for a PON.

In some examples, a protection switch that measures peak optical power of the upstream signals may reside at or near the OLT. If the protection switch determines that a primary optical fiber failure exists, the protection switch serves to switch the OLT from the primary optical fiber link to a secondary optical fiber link that provides an alternative or backup link. In this case, the OLT stops transmitting and receiving optical signals via the primary fiber link that couples the OLT to the ONTs, and begins to transmit and receive optical signals via the secondary fiber link that also couples the OLT to the ONTs, permitting the OLT to maintain communication between the OLT and ONTs via a redundant link.

In some examples, a PON system that makes use of a PON protection technique as described in this disclosure may comprise one or more OLTs, a 1×N protection switch that is coupled, at one end, to an optical fiber link extending to and from the OLT, and coupled, at another end, to optical fiber links extending from the protection switch to an optical splitter/combiner. If the 1×N protection switch is a 1×2 switch, the protection switch may be coupled to primary and secondary optical fiber links extending to the optical splitter/combiner.

The splitter/combiner may be an N×M splitter/combiner coupled, at one end, to M (e.g., M=32) ONTs via M respective optical fiber links extending between the splitter/combiner and the ONTs. The splitter/combiner may be coupled, at another end, to the N (e.g., N=2) optical fiber links extending from the 1×N protection switch. Initially, in the case where N=2, the ONTs may receive signals from and transmit signals to the OLT via the primary optical fiber link. If the 1×N protection switch detects, based on peak optical power, a failure on the primary optical fiber link extending between the protection switch and the splitter/combiner, the protection switch redirects upstream and downstream communications along the secondary optical fiber link.

A 1×N protection switch, where N=2 in the case of primary and secondary fiber links, may include suitable circuit components to measure the peak optical power of at least a portion of the optical signal transmitted upstream from the ONTs to the OLT on the primary PON fiber link, as described in more detail below. In some examples, the upstream optical signal is provided at a light wavelength of approximately 1310 nm. If the peak optical power is at or above a threshold value, the protection switch detects that the fiber is intact. If the peak optical power is below the threshold value, the protection switch detects that there is a fiber failure. If the protection switch determines there is a fiber failure, as described in more detail below, the 1×N protection switch switches from the primary PON fiber link to the secondary PON fiber link to reestablish upstream and downstream communication between the OLT and the ONTs.

FIG. 1 is a block diagram illustrating a passive optical network (PON) 10 configured to support a partial protection switching scheme. As shown in FIG. 1, PON 10 can be arranged to deliver voice, data and video content (generally "information") to a number of network nodes via optical fiber links. Example components for implementing a PON are commercially available from Calix, Inc., of Petaluma, Calif., and designated as the F-series Multiservice Gigabit PON (GPON) products, including the F5 OLT and associated F-series ONTs. The GPON standard is defined by ITU-T G984.2 and G983.3. There are other PON standards, such a Baseband PON (BPON—ITU-T 983.2) and Ethernet PON (EPON—IEEE 802.3ah). The approaches outlined in this disclosure may be applicable to all of these standards. As shown in FIG. 1, PON 10 may include an OLT 12, a 1×2 protection switch 28, a 2×N optical splitter/combiner 32, and a plurality of ONTs 34A-34N (collectively ONTs 34). An optical fiber link 26 extends between OLT 12 and 1×2 protection switch 28. Primary and secondary optical fiber links 30A, 30B extend between 1×2 protection switch 28 and 2×N splitter/combiner 32. Optical fiber links 35A-35N extend between 2×N splitter/combiner 32 and ONTs 34A-34N, respectively.

ONTs 34A-34N include hardware for receiving information over PON 10 via optical fiber links 35A-35N (collectively, optical fiber links 35, herein), and delivering the information to a connected subscriber device, or one or more connected devices. For example, each ONT 34 may serve as a PON access point for one or more computers, network appliances, televisions, set-top boxes, wireless devices, or the like, for video and data services. In addition, each ONT 34 may be connected to subscriber telephones for delivery of telephone services. Hence, ONT 34 may provide video to support television applications, data to support Internet access, and voice to support telephone services. OLT 12 may be located near or far from ONTs 34. In some existing networks, however, OLT 12 may reside in a central office (CO) situated within approximately twelve miles from each ONT 34.

An ONT 34 may be located at any of a variety of locations, including residential or business sites. In addition, a single ONT 34 may operate on a shared basis to deliver information to two or more closely located residences or businesses via copper or additional optical fiber connections, either directly or via a network hub, router or switch. ONT 34 also may include hardware for transmitting information over PON 10. For example, an ONT 34 may transmit voice information over PSTN 14 via OLT 12 and switch facility 16 in the course of a telephone conversation. In addition, an ONT 34 may transmit data to a variety of nodes on the Internet via ISP 18, router 20 and OLT 12. ONTs 34 typically transmit upstream over optical fiber links 35 using time division multiplexing techniques which require ONT ranging, and rely on a downstream grant packet for assignment of upstream time slots to each of ONTs 34. In some examples, ONTs 34 transmit upstream data at a light wavelength of approximately 1310 nanometers (nm).

OLT 12 may receive voice information, for example, from the public switched telephone network (PSTN) 14 via a switch facility 16. In addition, OLT 12 may be coupled to one or more Internet service providers (ISPs) 18 via the Internet and a router 20. As further shown in FIG. 1, OLT 12 may receive video content 22 from video content suppliers via a streaming video headend 24. In each case, OLT 12 receives the information, and distributes it to ONTs 34A through 34N (collectively "ONTs 34") via protection switch 28 and passive optical splitter/combiner 32. In the example of FIG. 1, protection switch 28 is external to OLT 12 and coupled to OLT 12 via optical fiber link 26. In this case, protection switch 28 receives downstream optical signals from OLT 12 and upstream optical signals from 2×N splitter/combiner 32.

In other examples, protection switch 28 may be coupled to OLT 12 via another type of communication medium, instead of optical fiber link 26, such as one or more metallic (e.g., copper) conductors or cables. In this case, protection switch 28 may include optical/electrical and electrical/optical conversion components to convert upstream optical signals from ONTs 34A-34N to electrical signals and convert downstream electrical signals from OLT 12 into downstream optical signals. In some examples, protection switch 28 may not be external to OLT 12. Instead, protection switch 28 may be formed integrally or within a common housing with OLT 12, in which case optical fiber link 26 may or may not be used for communication between OLT 12 and 1×2 protection switch 28. In addition, although only a single OLT 12 is provided, in some examples, an additional, redundant OLT may be provided in addition to OLT 12, thereby supporting more robust protection switching in the event OLT 12 or optical fiber link 26 is disabled.

As described above, 1×2 protection switch 28 may be external to OLT 12, housed in a common housing with OLT 12, or otherwise integrally formed with OLT 12. In addition, 1×2 protection switch 28 may communicate with the OLT 12 via optical fiber link 26 or any of a variety of alternative communication media, such as copper conductors or cabling. For purposes of illustration, however, the disclosure will generally refer to an example implementation in which 1×2 protection switch 28 is external to OLT 12 and coupled via optical fiber link 26. In this case, 1×2 protection switch 28 may be co-located with OLT 12 at a central office (CO) or other switching facility, or located at a close or remote distance from the OLT. In either case, 1×2 protection switch 28 monitors peak optical power of upstream signals received from ONTs 34A-34N via optical fiber links 35A-35N, 2×N splitter/combiner 32, and primary optical fiber link 30A. If the peak optical power measurement indicates a failure in primary optical fiber link 30A, protection switch 28 may transition upstream and downstream communications to secondary optical fiber link 30B to maintain or restore communication to the PON 10.

By locating protection switch 28 at the same location or at a location proximate to OLT 12, the protection switch may protect a majority of the length of PON 10. Other than a relatively short fiber run on fiber link 26, protection switch 28 may protect PON 10 against fiber failures on primary optical fiber link 30A extending between the protection switch and the splitter/combiner 32 that is located closer to ONTs 34A-34B. In addition, there is no need for protection switching hardware to be provided at each of the ONTs 34A-34B. If there is a fiber failure on one of fiber links 35A-35N, the problem can be isolated to the ONT 34A-34N associated with the respective fiber link. However, fiber failures on the primary optical fiber link 30A that serves multiple ONTs 34A-34N via splitter/combiner 32 can be handled by switching downstream and upstream PON communications over to secondary optical fiber link 30B, thereby avoiding communication failures among multiple ONTs.

As shown in FIG. 1, protection switch 28 couples to splitter/combiner 32 via primary optical fiber link 30A and secondary optical fiber link 30B. Primary optical fiber link 30A may provide the default connection for communication within PON 10, and may be referred to as the working optical fiber link. Secondary optical fiber link 30B may provide an alternative, backup connection in the event of failure of primary optical fiber link 30A, and may be referred to as the protection optical fiber link. Assuming there is no fiber failure, primary optical fiber link 30A communicates data between OLT 12 and ONTs 34A-34N. Secondary optical fiber link 30B is a redundant optical fiber link that also couples protection switch 28 to splitter/combiner 32. If there is fiber failure on primary optical fiber link 30A, upstream and downstream communication between OLT 12 and ONTs 34A-34N is rerouted across secondary optical fiber link 30B.

In some examples, primary optical fiber link 30A and secondary optical fiber link 30B may be geographically proximate to one another, e.g., buried in the ground immediately adjacent to one another. However, it may be preferable for primary optical fiber link 30A and secondary optical fiber link 30B to be geographically distant from one another to ensure that an accidental fiber cut does not occur simultaneously due to the same event. For example, a person digging near primary optical fiber link 30A may accidentally cut primary optical fiber link 30A with a digging tool. If secondary optical fiber link 30B is proximate to primary optical fiber link 30A, the same digging instrument may also simultaneously cut secondary optical fiber link 30B. If primary optical fiber link 30A and secondary PON fiber link 30B are located remotely from one another, e.g., by several meters or more, then the same digging instrument ordinarily will not cut both fiber links simultaneously.

In the example of FIG. 1, 2×N splitter/combiner 32 serves N ONTs (34A-34N). For downstream transmission of data, splitter/combiner 32 receives downstream optical signals from primary optical fiber link 30A, assuming there is no fiber failure. If there is a fiber failure on primary optical fiber link 30A, then splitter/combiner 32 can be switched to receive downstream optical signals via secondary optical fiber link 30B. Splitter/combiner 32 splits the downstream signals and distributes them to each one of ONTs 34 via respective optical fiber links 35A-35N. For upstream transmission of data, splitter/combiner 32 receives optical signals from ONTs 34A-34N and optically combines them. ONTs 34A-34N may be configured to transmit optical signals according to grants utilizing time division multiple access (TDMA) techniques.

Splitter/combiner 32 may transmit the upstream optical signals via both primary optical fiber link 30A and secondary optical fiber link 30B, i.e., on a redundant basis. As described in more detail below, protection switch 28 determines whether there is a fiber failure on primary optical fiber link 30A based on a measurement of peak optical power of the upstream optical signal. If there is no fiber failure on primary optical fiber link 30A, protection switch 28 provides OLT 12 with upstream signals from ONTs 34A-34N via primary optical fiber link 30A. If there is a fiber failure on primary optical fiber link 30A, however, protection switch 28 provides OLT 12 with upstream signals from ONTs 34A-34N via secondary optical fiber link 30B. Likewise, because the optical fiber links 30A, 30B are bidirectional, the failure ordinarily will impact both downstream and upstream communications. Therefore, protection switch 28 also routes downstream signals from OLT 12 via secondary optical fiber link 30B when a fiber failure is detected on primary optical fiber link 30A.

Figure 2A:
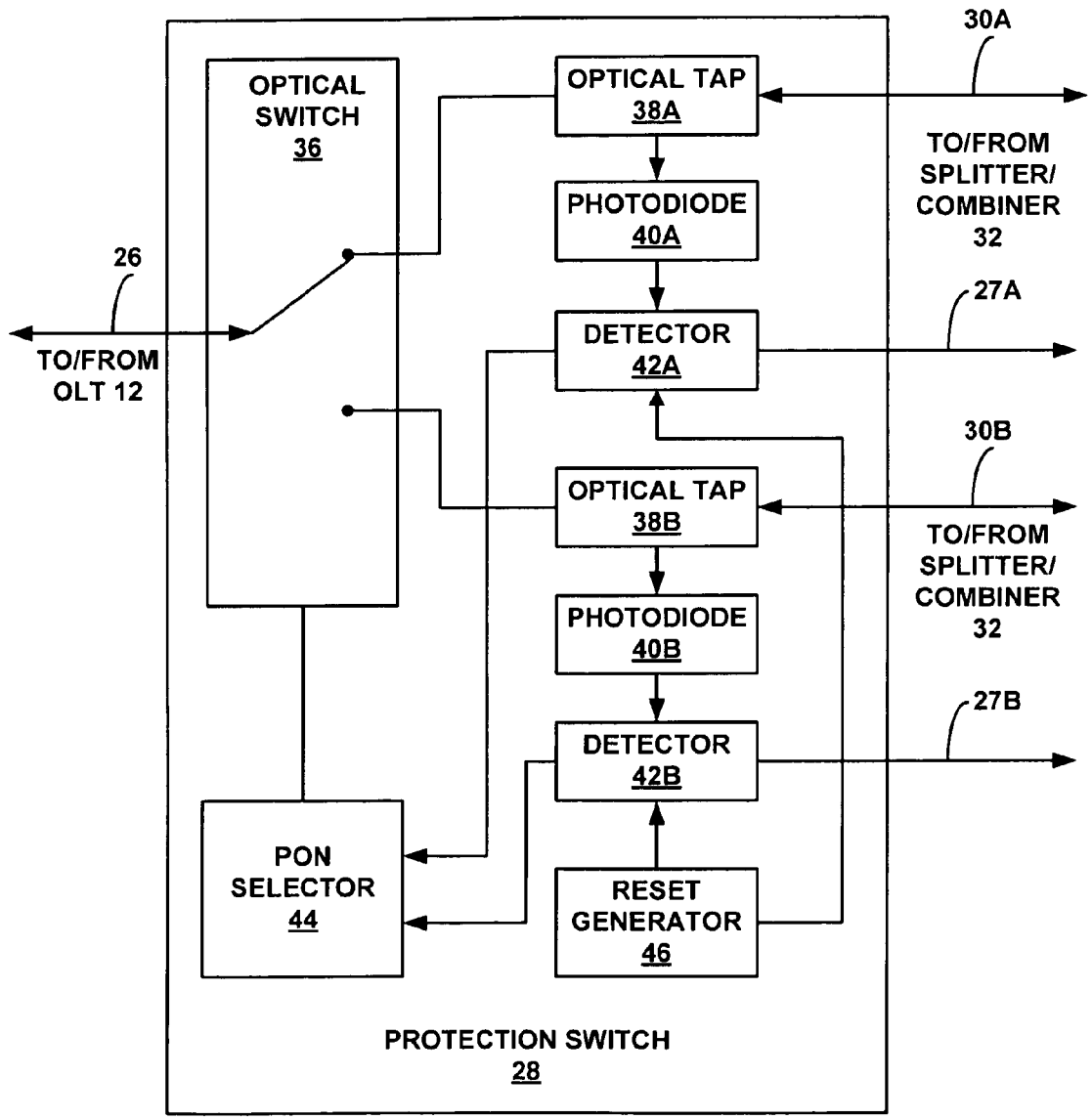
FIG. 2A is a block diagram illustrating an example protection switch.
Figure 2B:
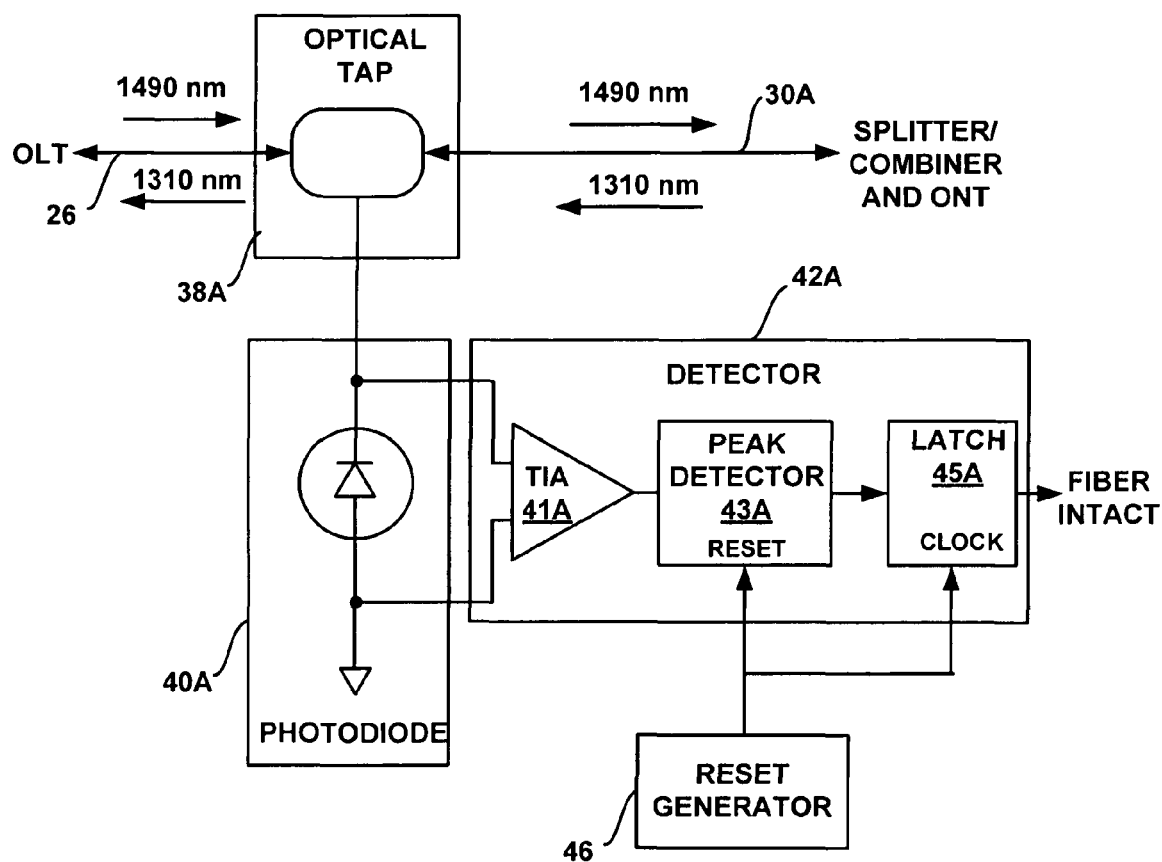
FIG. 2B is a block diagram illustrating components of the example protection switch of FIG. 2A in further detail.

As described in more detail with respect to FIGS. 2A and 2B, protection switch 28 may be configured to determine the peak power of the upstream optical signal on only primary optical fiber link 30A or on both primary optical fiber link 30A and secondary optical fiber link 30B. Protection switch 28 comprises at least one power detector that optically taps off a portion of the upstream optical signal from primary optical fiber link 30A. For example, the power detector may tap off approximately 10% (giving a signal that is 10 dB lower than the power input to the tap), resulting in a reduction of the transferred power by approximately 0.5 dB, although other tap values are also contemplated. The power detector may be a peak power detector that measures the power of the tapped off upstream optical signal from primary optical fiber link 30A.

If the peak power is greater than a predetermined threshold value, protection switch 28 determines that primary optical fiber link 30A is intact, or at least that a fiber failure cannot be detected. If the peak power is less than the threshold value, protection switch 28 determines that primary optical fiber link 30A has failed, e.g., due to a fiber cut. If there is a fiber cut on primary optical fiber link 30A, the power detector may provide a signal to an optical switch within protection switch 28. The optical switch, in response to the signal, switches from receiving and transmitting upstream and downstream signals via primary optical fiber link 30A to receiving and transmitting upstream and downstream signals via secondary optical fiber link 30B to maintain or reestablish communication between OLT 12 and ONTs 34.

If protection switch 28 determines that there is a fiber failure on primary optical fiber link 30A, in addition to rerouting via secondary optical fiber 30B, protection switch 28 may transmit an alarm signal to OLT 12 via an alarm line 27 to indicate the fiber failure. In some examples, alarm line 27 may comprise one or more metallic conductors or cables or an optical fiber. However, alarm line 27 may be separate from optical fiber link 26. As described in more detail below with respect to FIGS. 2A and 2B, in some examples, protection switch 28 monitors both primary optical fiber link 30A and secondary optical fiber link 30B to determine whether there is a fiber failure on either link. In such examples, protection switch 28 may transmit an alarm signal to indicate a fiber failure on primary optical fiber link 30A via coupling alarm line 27 and transmit another alarm signal to indicate a fiber failure on secondary optical fiber link 30B via alarm line 27 or a different alarm line.

The PON implementation illustrated in FIG. 1 may provide one or more advantages. In some cases, instead of requiring multiple redundant OLTs, PON 10 may only require one OLT, i.e., OLT 12, to support partial protection. However, in other examples, dual or multiple OLTs may be provided if added protection is desired. Further, instead of requiring protection switches on every ONT, PON 10 includes one protection switch, i.e., protection switch 28, between optical fiber link 26 and primary and secondary optical fiber links 30A, 30B. In addition, in the example of FIG. 1, PON 10 only includes two fiber links, primary optical fiber link 30A and secondary optical fiber link 30B, to extend from protection switch 28 to splitter/combiner 32, and then only one fiber link from splitter/combiner 32 for each one of ONTs 34A-34N. In other examples, more than two redundant optical fiber links may be provided between protection switch 28 and splitter/combiner 32. Also, as described above, protection switch 28 may be proximate to OLT 12 or comprised within OLT 12.

Protection switch 28 may provide the additional benefit of reducing the failure group size and increasing the per ONT availability. As described above, if there is a fiber failure on primary optical fiber link 30A, protection switch 28 switches from primary optical fiber link 30A to secondary optical fiber link 30B and ONTs 34 are capable of receiving and transmitting data even though there is a fiber failure on primary optical fiber link 30A. However, if there is a fiber cut on any one of the fiber links between splitter/combiner 32 and ONTs 34, protection switch 28 may not be able to reestablish communication between the ONTs 34 with the fiber failure and OLT 12. For example, if there is a fiber failure on the optical fiber link that couples splitter/combiner 32 to ONT 34A, protection switch 28 may not be able to reestablish communication between ONT 34A and OLT 12. However, the remaining ONTs 34B-34N will still be able to transmit optical signals to and receive optical signals from OLT 12, thereby reducing the failure group size to only a single ONT in the event of a single fiber failure between splitter/combiner 32 and ONTs 34A-34N, and increasing the per ONT availability of PON 10.

As described above, protection switch 28 may be configured to measure the peak optical power of at least a portion of the upstream optical signal received from splitter/combiner 32 via primary optical fiber link 30A. In general, it may not be necessary or useful to monitor the downstream optical signal at protection switch 28 because the downstream signal is not indicative of the condition of primary or secondary optical fiber links 30A, 30B. Rather, due to its position within PON 10, protection switch 28 receives the downstream optical signal from OLT 12 via optical fiber link 26. If failure of optical fiber link 26 were detected based on downstream optical signal characteristics, protection switch 28 could generate an alarm signal. However, selection of primary or secondary optical fiber link 30A, 30B would not provide a remedy for a fiber failure on optical fiber link 26. On the contrary, if there is a fiber failure on primary optical fiber link 30A, there may be little to no upstream optical signal on primary optical fiber link 30A. Accordingly, protection switch 28 measures the optical power of the upstream optical signal from primary optical fiber link 30A instead of the downstream optical signal from optical fiber link 26.

Protection switch 28 may be configured to measure peak optical power of the upstream optical signal instead of the average optical power of the upstream optical signal. The optical signals from ONTs 34 typically are transmitted in bursts. Accordingly, the optical signal from any one of ONTs 34 presents optical power only for a brief burst interval. Outside of the burst interval, each ONT 34 ordinarily does not present any optical power. ONTs 34A-34N may transmit optical signals in different, respective burst intervals, e.g., according to upstream grants defined by OLT 12 for TDMA-based upstream communication. However, ONTs 34A-34N still may present various intervals in which substantially no optical signal is transmitted. An idle ONT that is neither actively receiving nor transmitting data still may intermittently output an administrative optical signal to OLT 12 to indicate that the ONT is available to transmit and receive data.

Because the upstream optical signals from ONTs 34A-34N may be intermittent, the average power level for a burst of optical signals may be very low, e.g., much less than approximately −30 dBm, and may be very difficult to detect reliably. In particular, the time dependent upstream optical signal is not a repetitive function that results in a repeatable average value even though primary optical fiber link 30A is intact. As another example, consider a PON that has ONTs both near the OLT and at extreme range from the OLT. This scenario creates a wide range of received optical powers that may make the design of an average power detector difficult. For this reason, measurement of average optical power may be unreliable. Protection switch 28 may instead be configured to include a peak optical power detector, in accordance with various aspects of this disclosure. The protection switch 28 may comprise a peak power detector with a periodic reset function that permits the peak optical power to be measured in different intervals over the course of time.

A peak power detector with a periodic reset may provide one or more advantages. For example, OLT 12 may be configured to detect a plurality of upstream cells in every upstream frame. As one illustration, at OLT 12, there may be many 1310 nm cells that can be detected by the OLT within every GPON upstream traffic container (T-CONT). The peak power detector may be reset at some reasonable interval that is convenient, e.g., every 2 milliseconds (ms). The reset interval does not need to be synchronized with any timing from PON 10 and may run asynchronously with respect to PON 10. The detection of the peak optical power level ensures that the optical power is above a prescribed level, such as a levels specified by an applicable PON standard. By measuring the peak optical power level in specified intervals, such as 2 ms intervals, protection switch 28 may ensure that upstream optical signals from at least some of ONTS 34A-34N will be received, assuming there is no fiber failure on primary optical fiber link 30A.

FIG. 2A is a block diagram illustrating an example protection switch 28. FIG. 2B is a block diagram illustrating components of the example protection switch of FIG. 2A in further detail. With reference to FIG. 2A, protection switch 28 comprises optical switch 36, optical tap 38A, photodiode 40A, detector 42A, reset generator 46, and PON selector 44. Protection switch 28 also may comprise optical tap 38B, photodiode 40B, and detector 42B. In the example of FIG. 2A, optical tap 38A may be configured to tap off a certain amount of the upstream optical signal. For example, the upstream optical signal may be transmitted at a light wavelength of 1310 nm. Optical tap 38A may be configured to tap off the amount of 1310 nm upstream optical power necessary to perform an accurate and repeatable upstream power measurement. Optical tap 38A may allow all downstream optical signals to pass through with minimal loss of the downstream optical signal because no measurement of the downstream optical power is required. For example, the downstream optical signal may be transmitted at a light wavelength of 1550 nm or 1490 nm. Optical tap 38A may be configured to pass the 1550 or 1490 nm downstream optical signals with a minimum of loss.

Various components of protection switch 28 illustrated in FIG. 2A may be realized by any of a variety of suitable optical or electronic hardware components, software components, or any combination of such components. Some components, such as optical switch 36 and optical taps 38A, 38B, may be formed by optical hardware components. Other components, such as detectors 42A, 42B, PON selector 44, and reset generator 46 may be formed by suitable electronic hardware components, including discrete and/or integrated electrical circuitry, logic circuitry, or the like. Additionally, although shown as separate devices, photodiode 40A may be formed within optical tap 38A. Similarly, photodiode 40B may be formed within optical tap 38B. Hence, although some components are represented by separate, functional blocks to highlight different operations, in some examples, various components may be integrated with one another.

Some components may be realized at least in part as one or more software processes or modules executed by one or more programmable processors, microprocessors or digital signal processors (DSPs), one or more application specific integrated circuits (ASICs), one or more field programmable gate arrays (FPGAs), one or more Application Specific Special Processors (ASSPs) or other equivalent integrated or discrete logic circuitry.

Depiction of different features as modules in FIG. 2A is intended to highlight functional aspects of example protection switch 28 and does not necessarily imply that such modules must be realized by separate hardware or software components. Rather, functionality associated with some modules may be integrated within common or separate hardware or software components.

With further reference to FIG. 2A and FIG. 2B, optical tap 38A is coupled to receive the upstream signal from primary optical fiber link 30A. FIG. 2B illustrates detector 42A, photodiode 40A, and optical tap 38A in greater detail, and shows some example components of detector 42A. Detector 42B may conform substantially or identically to the depiction of detector 42A in FIG. 2B. Primary optical fiber link 30A, in some examples, may carry upstream optical signals in a band centered at approximately 1310 nm, and downstream signals in a band centered at approximately 1490 nm. The optical power of the upstream optical signal, in some examples, may be approximately −13 dBm to −28 dBm. Optical tap 38A taps off a portion of the upstream optical signal from primary optical fiber link 30A and provides the tapped optical signal to photodiode 40A. Optical taps 38A, 38B may be any optical tap component suitable for use in PON 10. In some examples, optical tap 38A taps off about 10%, resulting in a loss of 0.5 dB of the upstream optical signal. In other cases, optical tap 38A may tap off more or less than −0.5 dB, of the upstream signal.

In the example of FIG. 2A, detector 42A is configured to measure a peak optical power during a measurement interval, instead of measuring average power. Measurement of average power may not be a reliable technique for evaluating upstream optical signals to detect a fiber failure. An upstream optical signal in a PON may be provided in bursts where there the optical signal is provided in short, intermittent time intervals, rather than substantially continuously. Consequently, the average optical power for a given time interval may be very low, and in some cases nearly undetectable, because the optical signal is only available for a short duration. Utilizing average optical power may be particularly difficult during idle periods in which ONTs 34 are not actively transmitting data to OLT 12.

Even during idle periods in which ONTs 34 are not actively transmitting subscriber data, the ONTs 34 may transmit an upstream optical signal intermittently to OLT 12 to indicate that the ONT is still available to receive and transmit data. During such idle periods, the average optical power may be even further reduced. As a result, an average optical power meter may not be able to reliably detect optical power during such idle periods. The duty cycle of the upstream data during idle periods may be lower than the duty cycle during non-idle times. The duty cycle during idle times, i.e., the length of time an optical signal is transmitted to OLT 12, is very low. Since the optical signal is transmitted for only a brief interval in the entire duty cycle, the optical meter may not reliably detect an optical signal even though one exists on the fiber link.

In accordance with certain aspects of this disclosure, instead of an average optical power meter, photodiode 40A and detector 42A are configured to measure a peak optical power of at least a portion of a transmitted optical signal transmitted over optical fiber link 30A or 30B from ONTs 34. In one illustration, photodiode 40A may receive approximately −23 dBm to −38 dBm of the upstream optical signal from optical tap 38A, assuming a −10 dB tap by optical tap 38A. Photodiode 40A converts the upstream optical signal to an electrical current. In some examples, photodiode 40A may be a PIN photodiode, i.e., a p-type, intrinsic, n-type photodiode, or an avalanche photodiode.

In some examples, photodiode 40A may be a high bandwidth photodiode to allow detection of peak power levels on a high bandwidth basis, e.g., a bit-to-bit basis. In such examples, the bandwidth of photodiode 40A may be on the same order of the upstream transmission rate in PON 10. For example, a standard upstream transmission rate in a gigabit PON (GPON) is approximately 1.244 giga-Hertz (GHz). The bandwidth of photodiode 40A for bit-to-bit peak power detection would be approximately 1.244 GHz. However, such a high bandwidth photodiode may be unnecessary. Instead of bit-to-bit peak power detection, in some examples, the peak power detection may be based on measurement of peak power for a preamble of the upstream optical signal as described in more detail with respect to FIGS. 3A and 3B.

Photodiode 40A converts the upstream optical signal to an electrical current and provides the electrical current to detector 42A. As shown in FIG. 2B, detector 42A may comprise a transimpedance amplifier (TIA) 41A, a peak detector 43A, and a latch 45A. The TIA 41A converts the current from photodiode 40A into a voltage and provides the voltage to the peak detector 43A. Examples of peak detector 43A within detector 42A are shown in more detail in FIGS. 4A and 4C. In some examples, the TIA 41A may also comprise an amplifier to provide gain because the level of the current generated by photodiode 40A may be on the order of micro-amps.

As described above, the upstream optical signal may be provided in bursts. Generally, in one millisecond (ms) intervals, all ONTs 34 may provide an optical signal to OLT 12 even when idle. The peak detector within detector 42A may need to be capable of detecting power for at least one burst of a properly powered optical signal. If there is at least one burst of a properly powered optical signal, then primary optical fiber link 30A is intact. Accordingly, detector 42A may need to determine whether the peak optical power during a one millisecond interval is greater than a predetermined threshold value to detect at least one burst of a properly powered optical signal. However, to ensure proper measurement it may be beneficial to measure peak optical power over multiple intervals, e.g., over two ms or additional intervals. Detector 42A may be reset after measuring the peak power of the optical signal during a given interval, e.g., a 2 ms interval, and then proceed to measure peak power again in the next interval, e.g., another 2 ms interval, repeating this process over successive intervals in order to monitor peak power substantially continuously over a series of successive upstream optical signal bursts.

Reset generator 46 provides a reset signal to detector 42A. Notably, the reset signal from reset generator 46 may be asynchronous with respect to PON 10. As noted above, ONTs 34 may provide at least one optical signal for every one millisecond interval. Also, peak detector 43A within detector 42A may need to detect power for at least one burst of the upstream optical signal to determine whether there is a fiber failure on primary optical fiber link 30A. If the reset signal from reset generator 46 is provided periodically every two ms, i.e., detector 42A is reset in two ms intervals, then detector 42A is guaranteed to detect an optical signal from at least one of ONTs 34 (which generally transmit at one ms intervals) regardless of whether or not the reset signal from reset generator 46 is synchronous with the one ms rate interval at which ONTs 34 provide an optical signal. Reset generator 46 may provide a clock signal as the reset signal. The frequency of the clock signal is dependent upon the reset time interval. For example, if the reset time interval is two ms, then the frequency of the clock signal may be set at a clock frequency of 500 Hz.

Figure 4A:
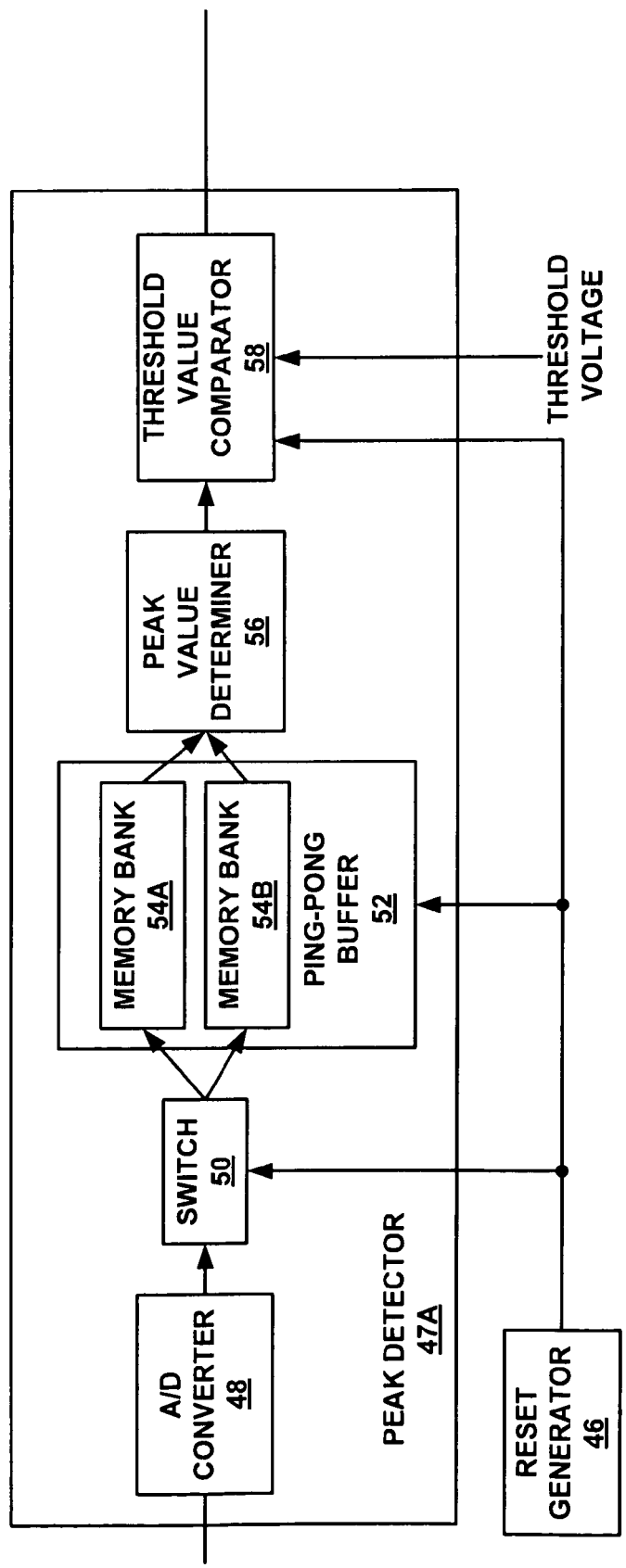
FIG. 4A is a block diagram illustrating an example digital peak detector.
Figure 4B:
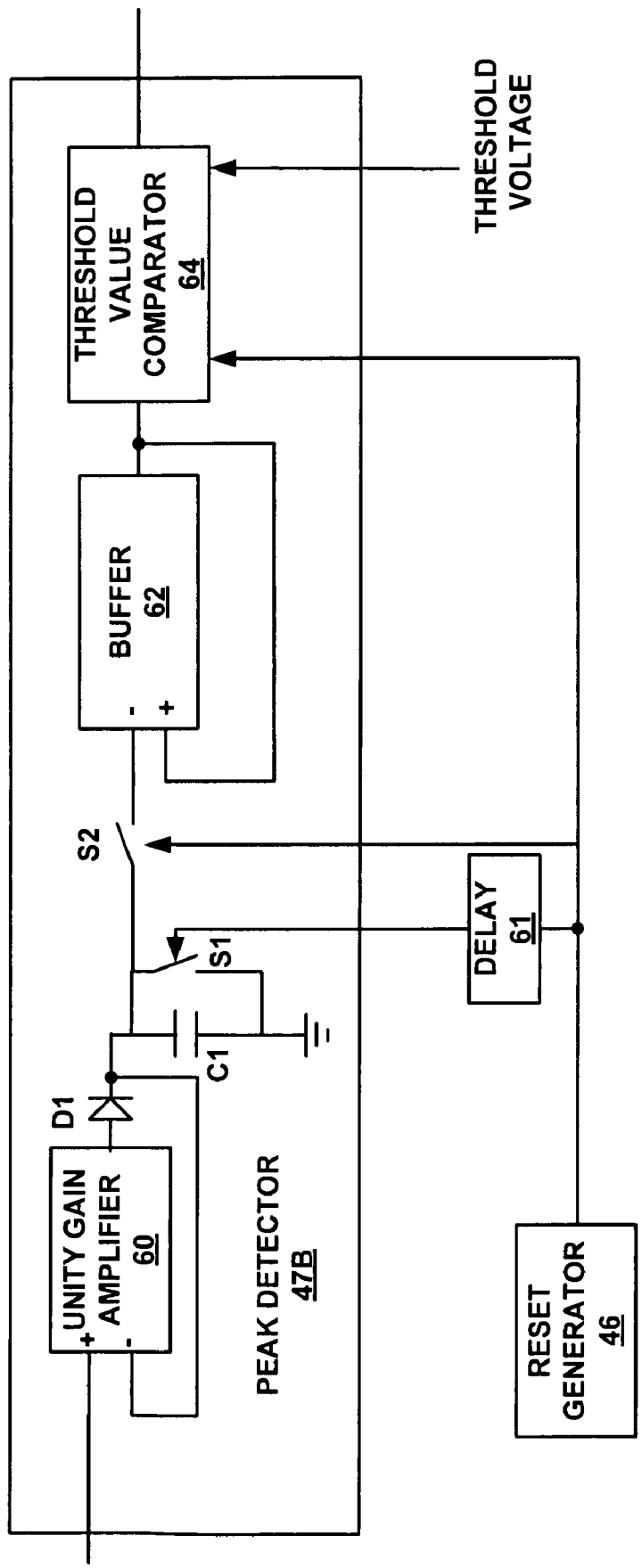
FIG. 4B is a block diagram illustrating an example analog peak detector.

With reference to FIG. 2B, the peak detector 43A within detector 42A measures the peak optical power of the tapped off portion of the upstream optical signal and compares the peak measurement to a threshold value as described in more detail with respect to FIGS. 4A and 4B. An example GPON threshold value is −27.5 dBm (measured at the fiber, e.g., measured at the input of optical tap 38A), which is computed by using the minimum upstream GPON transmit power from an ONT (−0.5 dBm) and subtracting the maximum GPON optical plant loss (28 dB for a class B+ PON). Note that peak detector 42A actually would need to detect a level of approximately −37.5 dBm because of the −10 dB tap assumption. Accordingly, detector 42A measures the peak optical power of the tapped off portion of the upstream optical signal and compares the peak measurement to a threshold value of −37.5 dBm as one example. If the peak measurement is less than the threshold value, detector 42A generates an indication that there is fiber failure on primary optical fiber link 30A. If the peak measurement is greater than or equal to the threshold value, detector 42A generates an indication that primary optical fiber link 30A is intact. The indication of a fiber failure may be generated if a sufficient peak amplitude (relative to the threshold) is not received in a given 2 ms interval. Alternatively, detector 42A may require an insufficient peak amplitude over n consecutive intervals, or over a percentage of a set of intervals (e.g., n of m intervals) before generating an indication of a fiber failure In some examples, the indication of fiber failure or an intact fiber link may simply be a digital value. For example, a binary "one" may represent that primary optical fiber link 30A is intact, while a binary "zero" may represent that there is fiber failure on primary optical fiber link 30A.

In the example of FIG. 2B, peak detector 43A may output the indication of fiber failure or an intact fiber link to latch 45A at the end of every reset interval based on the reset signal provided by reset generator 46. Latch 45A may be a D flip-flop. Latch 45A stores the indication of fiber failure or an intact fiber link, e.g., stores the digital zero or digital one to indicate fiber failure or an intact fiber link, respectively. Latch 45A outputs the indication of fiber failure or an intact fiber link every reset interval based on the reset signal provided by reset generator 46. Latch 45A outputs the indication to PON selector 44. In response, PON selector 44 causes optical switch 36 to switch from the primary optical fiber link 30A if latch 45A outputs an indication that there is fiber failure on primary optical fiber link 30A. If latch 45A outputs an indication that primary optical fiber link 30A is intact, PON selector 44 causes optical switch 36 to maintain its connection with primary optical fiber link 30A. In addition, if peak detector 43A provides an indication of fiber failure on primary optical fiber link 30A to latch 45A, latch 45A may output an alarm to OLT 12 via alarm line 27A indicating fiber failure on primary optical fiber link 30A.

In some examples, optical switch 36 may switch from primary optical fiber link 30A to secondary optical fiber link 30B within a short period of time, e.g., approximately 50 ms to 100 ms. After the switching time required to switch from primary optical fiber link 30A to secondary optical fiber link 30B, PON 10 (FIG. 1) can re-range and resume communication between OLT 12 and ONTs 34. This process may take a few seconds to a few minutes. During the brief switching time and re-ranging, there may be a temporary loss of communication between OLT 12 and ONTs 34. Hence, in some implementations, a partial protection PON as described in this disclosure may not provide "hitless" recovery, i.e., keeping all telephone calls and services active with minimal service impact after a fiber failure is detected.

Providing hitless recovery may require additional hardware and software that increases the costs of the PON, making it potentially unaffordable to many PON customers. However, the PON may nevertheless be configured to recover from a fiber failure relatively quickly. Due to the switching and re-ranging times, PON 10 may not provide hitless recovery. However PON 10 may not require additional hardware and software typically needed for hitless recovery, and thereby may provide an acceptable degree of protection performance, possibly with reduced cost and complexity in some implementations. In accordance with this disclosure, PON 10 may provide a less expensive solution to reestablishing communication between OLT 12 and ONTs 34 compared to hitless recovery provided by PON with full protection switching.

In some examples, the techniques described in this disclosure may allow addition of protection switching functions to systems that would not otherwise include integrated support for protection switching. A protection switching scheme, as described in this disclosure, may be designed to be added on to an existing PON system. In a simple form, when a fault occurs and the ONTs lose downstream communication, they may simply follow normal procedures for resetting on loss of signal. This may cause all ONTs to re-range and resume operation within a few seconds or few minutes. Hence, protection switching hardware may not be required at the ONT. With appropriate PON architecture, a majority of the length of a PON can be protected from a single-point fiber cut with only an OLT-positioned protection switch block, such as protection switch 28. In this case, the only PON section vulnerable to a fiber failure is in the PON segment from the local splitter/combiner to the ONT at the subscriber premises. In other implementations that include making changes to the OLT, the techniques may be configured to support hit-less recovery. These hit-less recovery additions can be added incrementally as development time and capital availability allows.

In some examples, if fiber failure on primary optical fiber link 30A is detected, optical tap 38A, photodiode 40A, and detector 42A may keep measuring the optical power of the upstream signal on the primary optical fiber link. After primary optical fiber link 30A is restored, e.g., as indicated by detection of a sufficient peak optical power by detector 42A, detector 42A may transmit a signal to PON selector 44 indicating that primary optical fiber link 30A is restored. PON selector 44 may then cause optical switch 36 to switch from secondary optical fiber link 30B to primary optical fiber link 30A, i.e., reestablish communication between OLT 12 and ONTs 34 via primary optical fiber link 30A. OLT 12 may need to re-range and services may then be restored. This process may take a few seconds to a few minutes.

As shown in FIG. 2A, protection switch 28 also comprises optical tap 38B, photodiode 40B, and detector 42B. In some examples, optical tap 38B, photodiode 40B, and detector 42B may not be necessary. In such examples, secondary optical fiber link 30B couples directly to optical switch 36. In particular, in some examples, optical fiber link 30B may be equipped with peak optical power detection. Alternatively, optical fiber link 30B may be assumed to be operable for purposes of switching from primary optical fiber link 30A to secondary optical fiber link 30B when a fiber failure is detected. As described above, if there is fiber failure on primary optical fiber link 30A, optical switch 36 switches upstream and downstream signals from primary optical fiber link 30A to secondary optical fiber link 30B. In examples where optical tap 38B, photodiode 40B, and detector 42B are not necessary, if there is fiber failure on primary optical fiber link 30A, then optical switch 36 disconnects from optical tap 38A and couples directly to secondary optical fiber link 30B.

However, in some examples, it may be beneficial to ensure that secondary optical fiber link 30B is also intact even when primary optical fiber link 30A is intact. For example if there is fiber failure on secondary optical fiber link 30B when primary optical fiber link 30A is intact, a technician may be able to restore secondary optical fiber link 30B so that if at some future time there is fiber failure on primary optical fiber link 30A, protection switch 28 can switch to secondary optical fiber link 30B to reestablish communication between OLT 12 and ONTs 34.

Splitter/combiner 32 may be configured to equally split the upstream optical signal and provides it to primary optical fiber link 30A and secondary optical fiber link 30B. Accordingly, optical tap 38B may be substantially similar to optical tap 38A and functions similarly. Photodiode 40B is substantially similar to photodiode 40A and functions similarly. Detector 42B is substantially similar or identical to detector 42A and functions similarly. If fiber failure is detected on secondary optical fiber link 30B, detector 42B transmits an alarm to OLT 12 via alarm line 27B. However, if detector 42B determines that there is fiber failure on secondary optical fiber link 30B, optical switch 36 will not switch since optical switch 36 is already coupled to primary optical fiber link 30A which is intact.

In some rare situations, it may be possible for there to be fiber failures on both primary optical fiber link 30A and secondary optical fiber link 30B. In such situations, after primary optical fiber link 30A is restored, optical switch 36 may restore communication between OLT 12 and ONTs 34 via primary optical fiber link 30A. OLT 12 may need to re-range, which may take a few seconds to a few minutes.

FIG. 2A provides an example of protection switch 28. As described above, protection switch 28 comprises an optical tap 38A that allows downstream optical signals to pass through via primary optical fiber link 30A. For upstream optical signals from primary optical fiber link 30A, optical tap 38A taps off a portion of the optical signal and provides it to photodiode 40A. Photodiode 40A converts the optical signal to an electrical current and provides the current to detector 42A. Detector 42A is a peak power detector that measures the peak power of the tapped off upstream optical signal based on the electrical current provided by photodiode 40A.

Detector 42A compares the measured peak power to a threshold. If the peak power is greater than the threshold, primary optical fiber link 30A is intact. If the peak power is less than the threshold, there is fiber failure on primary optical fiber link 30A. If there is fiber failure on primary optical fiber link 30A, detector 42A transmits an alarm to OLT 12 via alarm line 27A indicating fiber failure on primary optical fiber link 30A. In situations where there is fiber failure on primary optical fiber link 30A, detector 42A also transmits a signal to PON selector 44. In response PON selector 44 causes optical switch 36 to switch from primary optical fiber link 30A to secondary optical fiber link 30B.

Detector 42A may be periodically reset by reset generator 46. Reset generator 46 may provide a reset signal every two ms, as one example. In response to the reset signal, peak detector 43A discards a current peak measurement, and recommences the peak detection process for the next interval. In addition, latch 45A resets its output signal, and awaits the next fiber failure signal from peak detector 43A. Furthermore, in some examples, protection switch 28 also comprises optical tap 38B, photodiode 40B, and detector 42B which are substantially similar to optical tap 38A, photodiode 40A, and detector 42A, respectively. Optical tap 38B, photodiode 40B, and detector 42B measure the peak power on secondary optical fiber link 30B to determine whether there is fiber failure on secondary optical fiber link 30B. If there is fiber failure on secondary optical fiber link 30B, detector 42B transmits an alarm to OLT 12 via coupling line 27B.

Figure 3A:
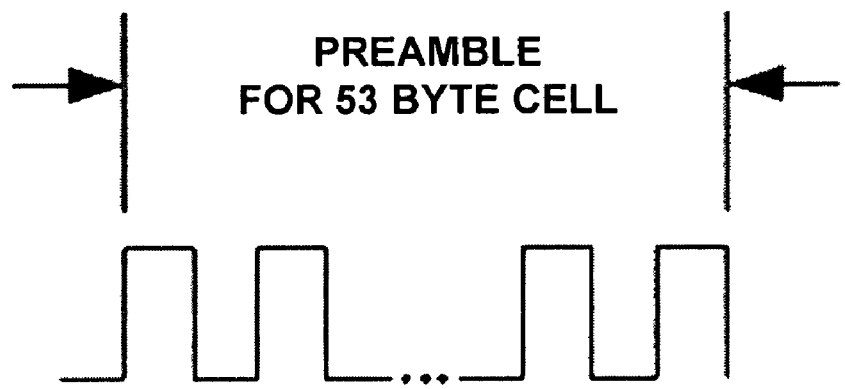
FIG. 3A is example timing diagram of a standard gigabit-PON (GPON) upstream data cell.
Figure 3B:
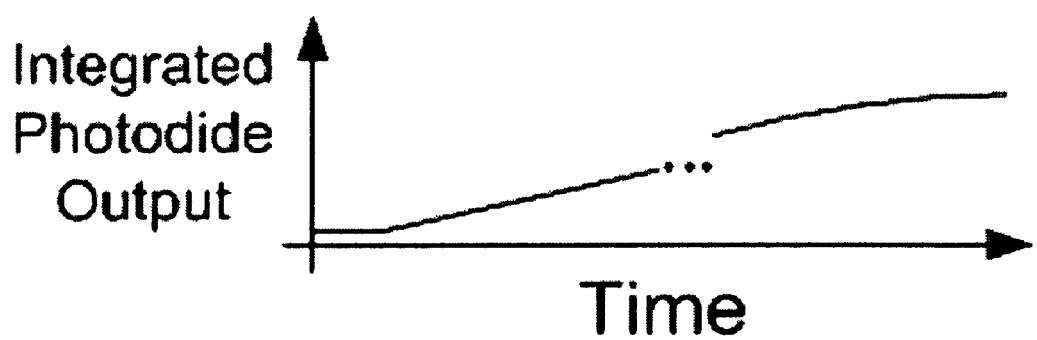
FIG. 3B is an example illustration of an integrated photodiode output with respect to time.

FIG. 3A is an example timing diagram of a standard GPON upstream data cell. Upstream GPON data may consist of 53 byte cells, each with a 5 byte preamble consisting of a 1-0 pattern. As noted above, in some examples, photodiode 40A may be a high bandwidth photodiode capable of detecting bit-to-bit power levels. However, such high bandwidth photodiodes may be expensive. In some examples, instead of detecting bit-to-bit power levels, an inexpensive, lower-bandwidth detector may be implemented to integrate the amplitude of the detected upstream optical signal over the preamble interval, i.e., over the 5 byte preamble interval. FIG. 3B is an example illustration of an integrated photodiode output with respect to time. As shown in FIG. 3B, the integrated photodiode output steadily increases over time. Assuming a standard GPON transmission rate of 1.244 GHz, the required photodiode bandwidth and its impact on sensitivity of the photodiode may be calculated as follows.

The bit time ($\tau_{BIT\_TIME}$) may be calculated as $1/1.244$ GHz which is equal to approximately 804 picoseconds (ps). One byte comprises eight bits. Therefore, there are forty bits in the preamble, e.g., five bytes multiplied by eight bits per byte. The preamble time ($\tau_{PREAMBLE}$) can be calculated by multiplying $\tau_{BIT\_TIME}$ by forty which is approximately 32.154 nanoseconds (ns). The bandwidth of the photodiode ($f_{BW\_PeakDetect}$) is the inverse of $\tau_{PREAMBLE}$ which is approximately 31.1 MHz. Accordingly, photodiode 40A may comprise a bandwidth of 31.1 MHz for detecting the signal over the preamble interval instead of a bandwidth of 1.244 GHz for detecting the signal bit-to-bit.

The bandwidth of a 1.244 GHz GPON cell, i.e., where the power of the GPON signal is at −6 dBm, is 900 MHz and referred to as $f_{BW\_GPON}$. The nominal sensitivity of photodiode 40A is approximately −25 dBm. The sensitivity of photodiode 40A may be calculated by dividing the bandwidth of the GPON cell, i.e., 900 MHz, by the bandwidth of the photodiode, i.e., 31.1 MHz. The logarithm of the divided value is then taken and multiplied by 10. The sensitivity of photodiode 40A is the logged-multiplied value subtracted from the nominal sensitivity of photodiode 40A which is approximately −39.615 dBm.

The preceding calculation is provided in equation form below:

$$\tau_{BitTime} := \frac{1}{1.244 \text{ GHz}}$$

$$byte := 8 \cdot bits$$

$$\tau_{Preamble} := \tau_{BitTime} \cdot 5 \cdot byte = 32.154 \text{ ns}$$

$$f_{BW\_PeakDetect} := \frac{1}{\tau_{Preamble}} = 31.1 \text{ MHz}$$

$$f_{BW\_GPON} := 900 \cdot \text{MHz}$$

$$v_{PIN\_Nominal} := -25 \cdot \text{dBm}$$

$$v_{Sensitivity} := v_{PIN\_Nominal} - 10 \log\left(\frac{f_{BW\_GPON}}{f_{BW\_PeakDetect}}\right) = -39.615 \text{ dBm}$$

The above derivation demonstrates that a simple PIN diode receiver may be useful in peak detection of upstream optical signals in a GPON-based PON.

As described above, in one example, optical tap 38A receives approximately −13 dBm to −28 dBm of upstream optical power. In some examples, optical tap 38A may tap off approximately 10% or −0.5 dB of optical power and provide it to photodiode 40A. Accordingly, photodiode 40A receives approximately −23 dBm to −38 dBm of optical power. The sensitivity of photodiode 40A is approximately −39.615 dBm. Therefore, a simple PIN diode receiver may be used to detect upstream optical signals.

FIG. 4A is a block diagram illustrating an example digital peak detector 47A. Digital peak detector 47A may be peak detector 43A within detector 42A. Digital peak detector 47A is shown merely for illustration purposes. Any suitable digital peak detector known in the art may be utilized. A similar or identical peak detector may be used in detector 42B. In the example of FIG. 4A, digital peak detector 47A comprises analog to digital (A/D) converter 48, switch 50, ping-pong buffer 52, peak value determiner 56, and threshold value comparator 58.

A/D converter 48 continuously receives the analog voltage output from TIA 41A within detector 42A and converts the analog voltage output to a plurality of digital values based on the sampling rate of A/D converter 48. Switch 50 is coupled to ping-pong buffer 52 and provides the digital values to either memory bank 54A or memory bank 54B based on the currently selected memory bank. For example, initially, switch 50 may be configured to transfer the digital values from A/D converter 48 to memory bank 54A. In this example, the currently selected memory bank is memory bank 54A. The currently selected memory bank 54A or 54B stores the plurality of digital values generated by A/D converter 48 where each digital value represents the instantaneous analog voltage generated by the TIA.

The reset signal from reset generator 46 causes the currently selected memory bank 54A or 54B to transfer the stored digital values to peak value determiner 56. The data within the currently selected memory bank is also cleared. In addition, the reset signal from reset generator 46 causes switch 50 to switch from the currently selected memory bank to the other memory bank. For example, if the currently selected memory bank is memory bank 54A, the reset signal from reset generator 46 causes switch 50 to switch from memory bank 54A to memory bank 54B so that the digital values from A/D converter 48 are stored in memory bank 54B.

Peak value determiner 56 receives and stores the plurality of digital values stored in the currently selected memory bank, e.g., memory bank 54A or memory bank 54B, and determines the highest digital value stored in the currently selected memory bank. The highest stored digital value in the memory bank corresponds to the peak power of the tapped off optical signal. Peak value determiner 56 provides the determined highest digital value to threshold value comparator 58. Threshold value comparator 58 compares the determined highest digital value to a threshold value. If the determined highest digital value is greater than or equal to the threshold value, threshold value comparator 58 outputs an indication that primary optical fiber link 30A is intact for the respective time interval of the reset signal.

If the determined highest digital value is less than the threshold value, threshold value comparator 58 outputs an indication that there is fiber failure on primary optical fiber link 30A for the respective time interval of the reset signal. In some examples, the indication of fiber failure or an intact fiber link may be a digital value, e.g., a zero represents a fiber failure and a one represents an intact fiber link. Threshold value comparator 58 outputs the indication to latch 45A. As described above, latch 45A stores the indication from threshold value comparator 58 and outputs the indication to PON selector 44 for every time interval of the reset signal.

PON selector 44 may be implemented in hardware and/or software, and is configured to control optical switch 36 based on the state of the fiber failure signal. PON selector 44 causes optical switch 36 to switch from primary optical fiber link 30A to secondary optical fiber link 30B if threshold value comparator 58 indicates fiber failure on primary optical fiber link 30A, in which cases detector 42A outputs the fiber failure signal to PON selector 44. In addition, threshold value comparator 58 may output an alarm to OLT 12 via alarm line 27A indicating fiber failure on primary optical fiber link 30A if threshold comparator 58 determines there is fiber failure on primary optical fiber link 30A for every time interval of the reset signal.

FIG. 4B is a block diagram illustrating an example analog peak detector 47B. Analog peak detector 47B may be peak detector 43A within detector 42A. Hence FIGS. 4A and 4B illustrate example digital and analog implementations of the peak detector. Analog peak detector 47B is shown merely for illustration purposes. Analog peak detector 47B comprises analog unity gain amplifier 60, delay block 61, high frequency precision diode D1, capacitor C1, switch S1, switch S2, buffer 62, and threshold value comparator 64. Initially, switch S1 and switch S2 are toggled open such that no current can flow through switch S1 and switch S2. Unity gain amplifier 60 receives the voltage from TIA 41A within detector 42A.

The voltage represents a power level of the upstream optical signal. When the voltage at capacitor C1 is less than the voltage from TIA 41A, diode D1 is turned on, i.e., conducts electricity, and unity gain amplifier 60 provides unity gain to the voltage from TIA 41A. Capacitor C1 will follow the voltage output of unity gain amplifier 60. When the voltage at capacitor C1 is greater than the voltage from TIA 41A, diode D1 is turned off, i.e., does not conduct electricity, and capacitor C1 will store the voltage. In this manner, capacitor C1 will store the peak voltage generated by TIA 41A. The peak voltage generated by TIA 41A corresponds to the peak optical power of the tapped off optical signal.

The reset signal from reset generator closes switch S1 and S2 such that switch S1 and S2 are capable of conducting electricity. However, switch S2 is closed before switch S1. As shown in FIG. 4B, the reset signal is delayed, e.g., phase-shifted, by delay block 61 before the reset signal closes switch S1. Accordingly, the peak voltage stored on capacitor C1 is first provided to buffer 62 by closing switch S2. Subsequently, capacitor C1 is discharged in response to the delayed reset signal by closing switch S1. Switches S1 and S2 may be configured to open after a pre-programmed interval. Switches S1 and S2 may be configured to open automatically without needing to receive a reset signal. Stated another way, switches S1 and S2 close based on the reset signal provided by reset generator 46. In some examples, however, switches S1 and S2 may open after a pre-programmed interval independent of the reset signal provided by reset generator 46.

Buffer 62 may provide a high impedance buffer for the voltage stored on capacitor C1. As shown in FIG. 4B, buffer 62 outputs a voltage to threshold value comparator 64. In some examples, threshold value comparator 64 may resistively load capacitor C 1, thereby reducing the voltage on capacitor C1. Buffer 64 provides a high impedance buffer to reduce the loading caused by threshold value comparator 64, and thereby maintains the voltage on capacitor C1.

Threshold value comparator 64 compares the peak voltage generated by TIA 41A to a threshold value. If the peak voltage is greater than or equal to the threshold value, threshold value comparator 64 outputs an indication that primary optical fiber link 30A is intact for the respective interval of the reset signal. If the peak voltage is less than the threshold value, threshold value comparator 64 outputs an indication that there is fiber failure on primary optical fiber link 30A for the respective interval of the reset signal. Threshold value comparator 64 outputs the indication to latch 45A. As described above, latch 45A digitally stores the indication from threshold value comparator 64 and outputs the indication to PON selector 44 during each interval of the reset signal.

In response, PON selector 44 causes optical switch 36 to switch from primary optical fiber link 30A to secondary optical fiber link 30B if threshold value comparator 58 indicates fiber failure on primary optical fiber link 30A. In addition, threshold value comparator 58 may output an alarm to OLT 12 via alarm line 27A indicating fiber failure on primary optical fiber link 30A if threshold comparator 58 determines there is fiber failure on primary optical fiber link 30A every interval of the reset signal.

Figure 5:
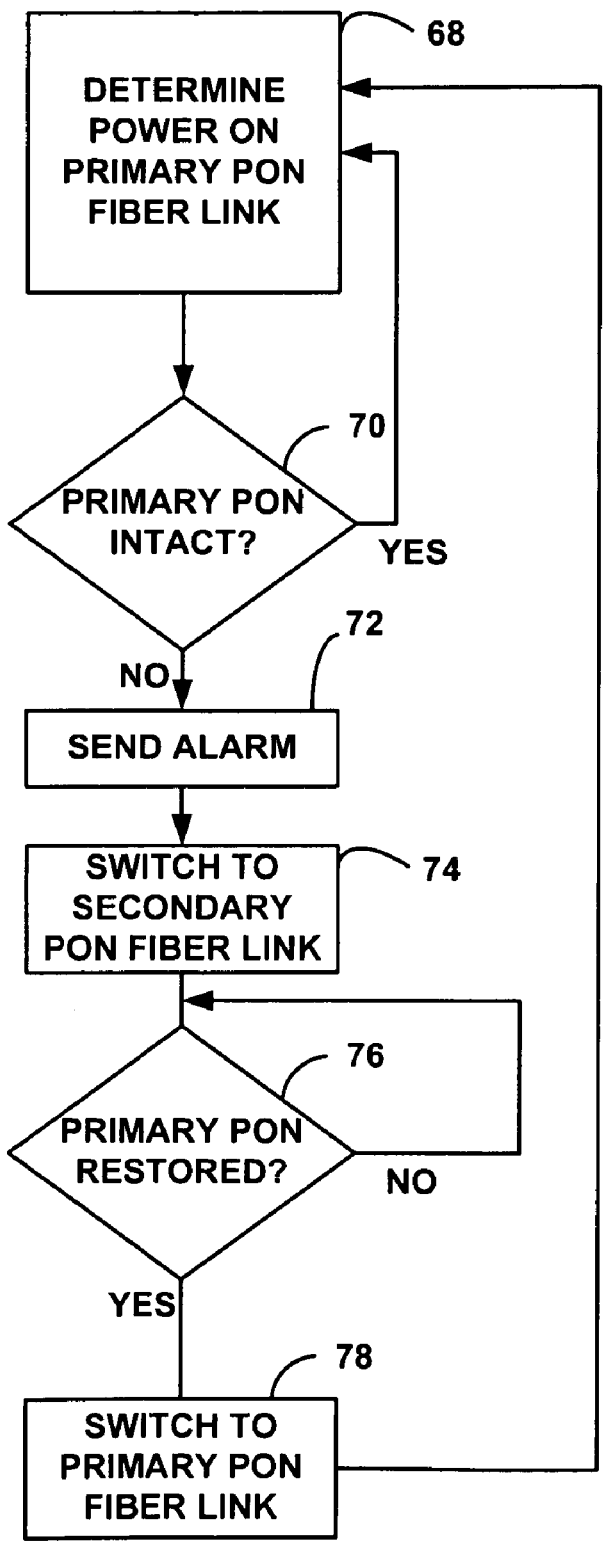
FIG. 5 is a flow diagram illustrating a first example operation of a protection switch.
Figure 6:
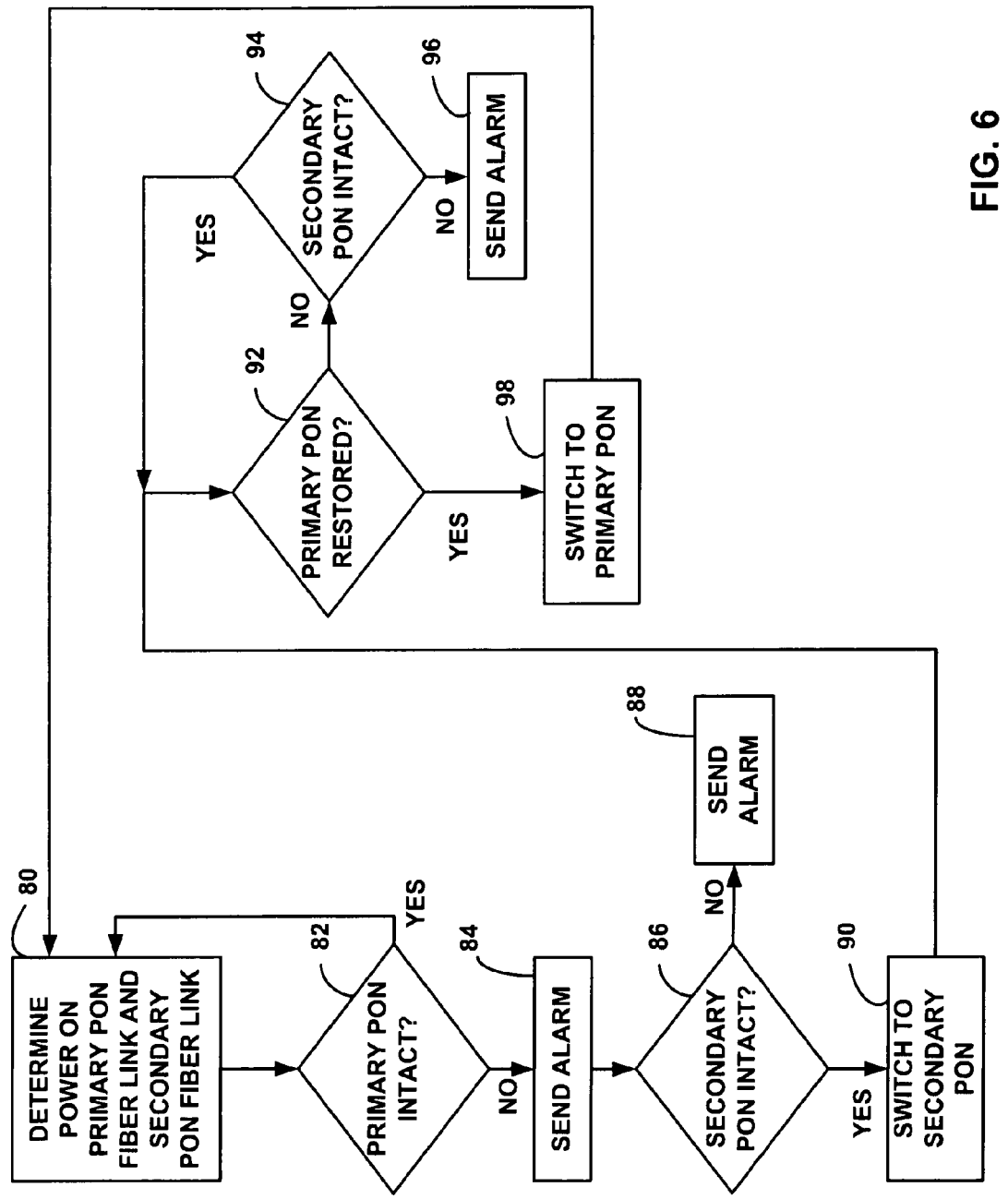
FIG. 6 is a flow diagram illustrating a second example operation of a protection switch.
Figure 7:
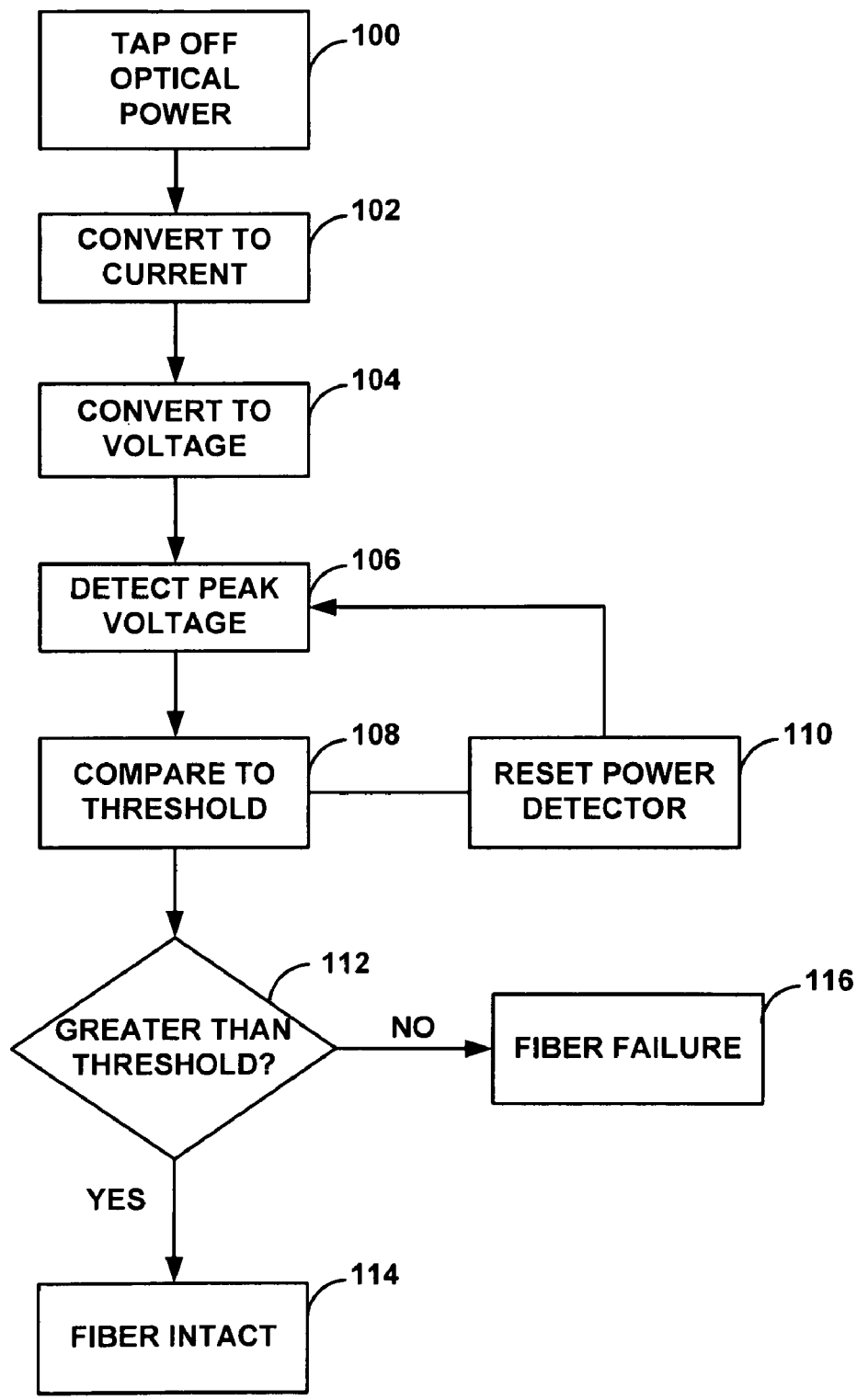
FIG. 7 is a flow diagram illustrating an example technique for measuring optical power to determine whether there is a fiber failure.

FIG. 5 is a flow diagram illustrating a first example operation of protection switch 28. The processes illustrated in FIG. 5 and FIGS. 6 and 7 are presented for purposes of illustration, and should be considered non-limiting. In addition, in some cases, the processes in FIGS. 5-7, as well as the components described throughout this description, may be customized in different ways to reflect the needs of different customers. In the discussion of FIG. 5, reference is made to components described in FIG. 2A. Detector 42A in conjunction with optical tap 38A and photodiode 40A determines whether there is fiber failure on primary optical fiber link 30A by measuring the optical power on primary optical fiber link 30A (68). Again, the measured power may be a peak optical power level of the upstream optical signal.

Techniques for measuring optical power to determine whether there is fiber failure on primary optical fiber link 30A are described in more detail with respect to FIG. 7. If primary optical fiber link 30A is intact (YES of 70), the process loops back to detector 42A determining whether there is fiber failure on primary optical fiber link 30A (68). If detector 42A determines that there is fiber failure on primary optical fiber link 30A (NO of 70), detector 42A transmits an alarm to OLT 12 via alarm line 27A indicating there is fiber failure on primary optical fiber link 30A (72). Detector 42A then transmits a signal to PON selector 44 indicating fiber failure on primary optical fiber link 30A. In response, PON selector 44 causes optical switch 36 to switch from primary optical fiber link 30A to secondary optical fiber link 30B (74).

Detector 42A continuously measures the optical power of the upstream optical signal on primary optical fiber link 30A and continuously determines whether primary optical fiber link 30A has been restored, i.e., whether the cause of the fiber failure on primary optical fiber link 30A has been restored (76). Again, the measured power may be a peak optical power level of the upstream optical signal. If detector 42A determines that there is still fiber failure on primary optical fiber link 30A (NO of 76), the process loops back to detector 42A measuring the optical power on primary optical fiber link 30A to determine whether primary optical fiber link 30A has been restored (76). If primary optical fiber link 30A has been restored (YES of 76), detector 42A transmits a signal to PON selector 44 which causes optical switch 36 to switch from secondary optical fiber link 30B to primary optical fiber line 30A (78). Detector 42A then returns to determining whether there is fiber failure on primary optical fiber link 30A by measuring the optical power on primary optical fiber link 30A (70).

FIG. 6 is a flow diagram illustrating a second example operation of protection switch 28. For clarity, reference is made to FIG. 2A. Detector 42A in conjunction with optical tap 38A and photodiode 40A and detector 42B in conjunction with optical tap 38B and photodiode 40B determine whether there is fiber failure on primary optical fiber link 30A and secondary optical fiber link 30B by measuring the optical power on primary optical fiber link 30A and secondary optical fiber link 30B (80). The measures power may be a peak optical power level of the upstream optical signal. Techniques for measuring optical power to determine whether there is fiber failure on primary optical fiber link 30A and secondary optical fiber link 30B re described in more detail with respect to FIG. 7. If primary optical fiber link 30A is intact (YES of 82), the process loops back to detector 42A determining whether there is fiber failure on primary optical fiber link 30A (80). If detector 42A determines that there is fiber failure on primary optical fiber link 30A (NO of 82), detector 42A transmits an alarm to OLT 12 via alarm line 27A indicating there is fiber failure on primary optical fiber link 30A (84).

Detector 42B continuously measures the optical power on secondary optical fiber link 30B and determines whether there is fiber failure on secondary optical fiber link 30B (86). If there is fiber failure on secondary optical fiber link 30B (NO of 86), detector 42B transmits a major alarm to OLT 12 via alarm line 27B indicating there is fiber failure on secondary optical fiber link 30B (88). In this situation, the alarm may be considered a major alarm because there is fiber failure on both primary and second optical fiber links 30A and 30B. If secondary optical fiber link 30B is intact (YES of 86), detector 42A transmits a signal to PON selector 44 indicating fiber failure on primary optical fiber link 30A. In response, PON selector 44 causes optical switch 36 to switch downstream and upstream optical signals from primary optical fiber link 30A to secondary optical fiber link 30B (90).

Similar to detector 42B, detector 42A continuously measures the optical power on primary optical fiber link 30A and determines whether primary optical fiber link 30A has been restored, i.e., whether the cause of the fiber failure on primary optical fiber link 30A has been repaired (92). The measured power may be a peak optical power level of the upstream optical signal. If primary optical fiber link 30A has not been restored (NO of 92), detector 42B ensures that secondary optical fiber link 30B is still intact (94). If detector 42B determines that there is fiber failure on secondary optical fiber link 30B (NO of 94), detector 42B transmits an alarm to OLT 12 via alarm line 27B indicating there is fiber failure on secondary optical fiber link 30B (96). If detector 42B determines that secondary optical fiber link 30B is intact, the process loops back to whether primary optical fiber link 30A has been restored (92).

If primary optical fiber link 30A has been restored (YES of 92), detector 42A transmits a signal to PON selector 44 which causes optical switch 36 to switch from secondary optical fiber link 30B to primary optical fiber link 30A (98). The process than loops back to detector 42A and detector 42B determining whether there is fiber failure on primary optical fiber link 30A and secondary optical fiber link 30B by measuring the optical power on primary optical fiber link 30A and secondary optical fiber link 30B (80).

FIG. 7 is a flow diagram illustrating an example technique for measuring optical power to determine whether there is fiber failure on primary optical fiber link 30A and secondary optical fiber link 30B. In the discussion of FIG. 7, reference is made to FIG. 2A. For measuring optical power and determining whether there is fiber failure on primary optical fiber link 30A, optical tap 38A taps off a portion of the upstream optical signal. As an illustration, optical tap 38A may be configured to tap off 10% or −0.5 dB of the upstream optical signal from primary optical fiber link 30A (100).

Photodiode 40A converts the tapped off upstream optical signal to an electrical current and provides the electrical current to detector 42A (102). Detector 42A comprises a TIA, peak detector, e.g., peak detector 47A (FIG. 4A) or peak detector 47B (FIG. 4B), and a latch. The TIA converts the current to a voltage, and in some examples, provides gain (104). The peak detector measures the peak voltage from the TIA (106) and compares the peak voltage to a threshold value (108). Reset generator 44 provides a reset signal and resets detector 42A (110). The process than loops back to the peak detector measuring the peak voltage and comparing the peak voltage to the threshold value (106).

If the measured peak voltage is greater than or equal to the threshold (YES of 112), detector 42A determines that primary optical fiber link 30A is intact. If the measured peak voltage is less than the threshold (NO of 112), detector 42A determines that there is fiber failure on primary optical fiber link 30A.

For detecting a fiber cut on secondary optical fiber link 30B, a substantially equivalent or identical technique may be used by optical tap 38B, photodiode 40B, and detector 42B. For example, optical tap 38B taps off the upstream optical signal from secondary optical fiber link 30B. Photodiode 40B converts the tapped off optical signal from secondary optical fiber link 30B to a current and provides the current to detector 42B. Detector 42B measures and compares the peak voltage to a threshold to determine whether secondary optical fiber link 30B is intact, or whether there is fiber failure on secondary optical fiber link 30B.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software, the techniques may be realized at least in part by a computer-readable medium comprising instructions that, when executed, cause a processor to perform one or more of the methods described above. For example, the computer-readable medium may store such instructions.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
converting a portion of an upstream optical signal transmitted via an optical fiber link in a passive optical network (PON) to an electrical current;
converting the electrical current to an electrical voltage;
measuring a peak voltage of the electrical voltage;
determining a peak optical power of at least the portion of the upstream optical signal transmitted via the optical fiber link in the PON based on the peak voltage;
comparing the peak optical power to a threshold value; and
detecting a failure of the optical fiber link based on the comparison.

2. The method of claim 1, further comprising optically tapping the optical fiber link to produce the portion of the upstream optical signal.

3. The method of claim 1, wherein the optical fiber link is a first optical fiber link that carries the upstream optical signal and a downstream optical signal, the method further comprising:
switching the upstream and downstream optical signals generated in the PON from the first optical fiber link to a second optical fiber link when the failure of the first optical fiber link is detected.

4. The method of claim 3, further comprising:
detecting restoration of the first optical fiber link based on the comparison; and
switching the upstream and downstream optical signals generated in the PON from the second optical fiber link to the first optical fiber link when the restoration of the first optical fiber link is detected.

5. The method of claim 1, wherein the optical fiber link comprises a first optical fiber line, and the threshold value comprises a first threshold value, the method further comprising:
measuring a peak optical power of at least a portion of the upstream optical signal transmitted via a second optical fiber link in the passive optical network (PON);
comparing the measured peak optical power of the at least a portion of the upstream optical signal transmitted via the second optical fiber link to a second threshold value; and
detecting a failure of the second optical fiber link based on the comparison to the second threshold value.

6. The method of claim 5, further comprising generating a fiber failure alarm when the failures of the first and second optical fiber links are detected.

7. The method of claim 1, wherein the upstream optical signal comprises a light wavelength of approximately 1310 nanometers.

8. The method of claim 1, wherein determining the peak optical power comprises:
determining the peak optical power over a measurement interval, the method further comprising:
resetting the measurement interval to obtain multiple peak optical power measurements over a period of time.

9. The method of claim 8, wherein a length of the interval is approximately two milliseconds.

10. A protection switch in a passive optical network (PON), the protection switch comprising:
an optical tap that includes a photodiode and receives an upstream optical signal transmitted via an optical fiber link in the PON; and
a detector that receives at least a portion of the upstream optical signal from the optical tap, measures a peak optical power of the portion of the upstream optical signal, compares the measured peak optical power to a threshold value, and detects a failure on the optical fiber link based on the comparison,
wherein the detector comprises:
a transimpedance amplifier that receives an electrical current from the photodiode and converts the electrical current to an electrical voltage;
a peak detector that measures a peak voltage of the electrical voltage, wherein the peak voltage corresponds to the peak optical power of the portion of the upstream optical signal; and
a threshold value comparator that compares the peak voltage to a threshold value and detects the failure based on the comparison.

11. The protection switch of claim 10, wherein the optical tap taps the optical fiber link to produce the portion of the upstream optical signal.

12. The protection switch of claim 10, wherein the optical fiber link is a first optical fiber link that carries the upstream optical signal and a downstream optical signal, the protection switch further comprising:
an optical switch that switches the upstream and downstream optical signals generated in the PON from the first optical fiber link to a second optical fiber link when the failure of the first optical fiber link is detected.

13. The protection switch of claim 12, wherein the detector detects restoration of the first optical fiber link based on the comparison, and wherein the optical switch switches the upstream and downstream optical signals generated in the PON from the second optical fiber link to the first optical fiber link when restoration of the first optical fiber link is detected.

14. The protection switch of claim 10, wherein the optical tap comprises a first optical tap, the detector comprises a first detector, the threshold value comprises a first threshold value, and the optical fiber link in the PON comprises a first optical fiber link in the PON, the protection switch further comprising:
a second optical tap that receives an upstream optical signal transmitted via a second optical fiber link in the PON; and
a second detector that receives at least a portion of the upstream optical signal from the second optical tap, measures a peak optical power of the portion of the upstream optical signal, compares the measured peak optical power to a second threshold value, and detects a failure on the second optical fiber link based on the comparison to the second threshold value.

15. The protection switch of claim 14, wherein the first and second detectors generate an alarm when the failures of the first and second optical fiber links are detected.

16. The protection switch of claim 10, wherein the upstream optical signal comprises a light wavelength of approximately 1310 nanometers.

17. The protection switch of claim 10, further comprising:
a reset generator that sets a measurement interval and resets the detector every measurement interval.

18. The protection switch of claim 17, wherein a length of the interval is approximately two milliseconds.

19. A passive optical network (PON) comprising:
an optical line terminal (OLT);
a protection switch coupled to the OLT;
one or more optical network terminals (ONTs); and
a first optical fiber link and a second optical fiber link coupled to the protection switch and to the one or more ONTs,
wherein the protection switch comprises:
an optical tap that receives an upstream optical signal transmitted via the first optical fiber link in the PON from the one or more ONTs,
a detector that receives at least a portion of the upstream optical signal from the optical tap, measures a peak optical power of the portion of the upstream optical signal, compares the measured peak optical power to a threshold value, and detects a failure on the optical fiber link based on the comparison, and
an optical switch that couples the upstream optical signal and a downstream optical signal on the first optical fiber link or the second optical fiber link based on the detection of the failure.

20. The PON of claim 19, further comprising a splitter/combiner that receives optical signals from the one or more ONTs, combines the optical signals, and provides the combined optical signals on the first optical fiber link and the second optical fiber link.

21. The PON of claim 19, wherein the detector outputs an alarm signal to the OLT based on the detection of the failure.

22. The PON of claim 19, wherein the detector comprises:
a transimpedance amplifier that receives an electrical current from a photodiode comprised within the optical tap and converts the electrical current to an electrical voltage;
a peak detector that measures a peak voltage of the electrical voltage, wherein the peak voltage corresponds to the peak optical power of the portion of the upstream optical signal; and
a threshold value comparator that compares the peak voltage to a threshold value and detects the failure based on the comparison.

23. An apparatus comprising:
means for converting a portion of an upstream optical signal transmitted via an optical fiber link in a passive optical network (PON) to an electrical current;
means for converting the electrical current to an electrical voltage;
means for measuring a peak voltage of the electrical voltage;
means for determining a peak optical power of at least the portion of the upstream optical signal transmitted via the optical fiber link in the PON based on the peak voltage;
means for comparing the peak optical power to a threshold value; and
means for detecting a failure of the optical fiber link based on the comparison.

24. The apparatus of claim 23, further comprising means for optically tapping the optical fiber link to produce the portion of the upstream optical signal.

25. The apparatus of claim 23, wherein the optical fiber link is a first optical fiber link that carries the upstream optical signal and a downstream optical signal, the apparatus further comprising:
means for switching the upstream and downstream optical signals generated in the PON from the first optical fiber link to a second optical fiber link when the failure of the first optical fiber link is detected.

26. The apparatus of claim 25, further comprising:
means for detecting restoration of the first optical fiber link based on the comparison; and
means for switching the upstream and downstream optical signals generated in the PON from the second optical fiber link to the first optical fiber link when the restoration of the first optical fiber link is detected.

27. The apparatus of claim 23, wherein the optical fiber link comprises a first optical fiber line, and the threshold value comprises a first threshold value, the apparatus further comprising:
means for measuring a peak optical power of at least a portion of the upstream optical signal transmitted via a second optical fiber link in the passive optical network (PON);
means for comparing the measured peak optical power of the at least a portion of the upstream optical signal transmitted via the second optical fiber link to a second threshold value; and
means for detecting a failure of the second optical fiber link based on the comparison to the second threshold value.

* * * * *